(12) United States Patent
Hiroki et al.

(10) Patent No.: US 7,896,484 B2
(45) Date of Patent: Mar. 1, 2011

(54) INK JET RECORDING APPARATUS

(75) Inventors: Masashi Hiroki, Yokohama (JP);
 Kazuhiko Ohtsu, Mishima (JP); Yoshito Endo, Shizuoka-ken (JP); Toru Ushirogouchi, Yokohama (JP); Ryozo Akiyama, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 448 days.

(21) Appl. No.: 12/156,889

(22) Filed: Jun. 5, 2008

(65) Prior Publication Data
 US 2008/0273066 A1 Nov. 6, 2008

Related U.S. Application Data

(62) Division of application No. 10/806,818, filed on Mar. 22, 2004, now Pat. No. 7,417,074.

(30) Foreign Application Priority Data

Sep. 11, 2003 (JP) .................................. 2003-319841

(51) Int. Cl.
| | |
|---|---|
| B41J 2/17 | (2006.01) |
| B41J 2/175 | (2006.01) |
| B41J 2/00 | (2006.01) |
| B41J 2/005 | (2006.01) |
| C08F 2/50 | (2006.01) |
| C08J 3/28 | (2006.01) |
| C09D 11/02 | (2006.01) |
| C09D 11/10 | (2006.01) |

(52) U.S. Cl. ............... 347/100; 347/20; 347/40; 347/43; 347/84; 347/85; 347/86; 347/95; 347/98; 347/19; 347/5; 347/21; 522/65; 522/64; 522/67; 522/170; 522/168; 106/31.13; 106/31.6; 427/508; 427/511; 427/510; 428/32.26

(58) Field of Classification Search .................... 347/20, 347/40, 43.84, 85, 86, 95, 96, 98, 100, 19, 347/5, 21; 522/65, 54, 67, 170, 168; 106/31.13, 106/31.6; 427/508, 510, 511; 428/32.26
See application file for complete search history.

(56) References Cited

U.S. PATENT DOCUMENTS

| | | | | | |
|---|---|---|---|---|---|
| 5,641,346 | A | * | 6/1997 | Mantell et al. | ............. 106/31.58 |
| 5,830,385 | A | * | 11/1998 | Lau et al. | ................. 252/299.01 |
| 5,889,084 | A | * | 3/1999 | Roth | .............................. 523/161 |

(Continued)

FOREIGN PATENT DOCUMENTS

EP 0 779 346 A2 6/1997

(Continued)

*Primary Examiner* — Sanza L McClendon
(74) *Attorney, Agent, or Firm* — Patterson & Sheridan, LLP

(57) ABSTRACT

An ink jet recording apparatus comprising a color ink container having a capacity V1 accommodating therein a solvent polymerizable in the presence of an acid and a colorant, a reaction liquid container having a capacity V2 (V2<V1) accommodating therein a reaction liquid comprising a solvent, and a photo-acid generating agent capable of generating an acid when irradiated with light, a stirring container mixing the color ink and the reaction liquid at a mixing ratio of S1:S2 (the color ink:the reaction liquid) to prepare a recording ink, a color ink supply means feeding the color ink to the stirring container, a reaction liquid supply means feeding the reaction liquid to the stirring container, an ink jet recording head ejecting the recording ink to a recording medium, and a supply tube feeding the recording ink to the recording head.

13 Claims, 4 Drawing Sheets

U.S. PATENT DOCUMENTS

| | | | |
|---|---|---|---|
| 6,054,501 A | 4/2000 | Taniguchi et al. | |
| 6,059,993 A * | 5/2000 | Baba et al. | 252/299.1 |
| 6,084,619 A * | 7/2000 | Takemoto et al. | 347/96 |
| 6,354,700 B1 * | 3/2002 | Roth | 347/103 |
| 6,633,354 B2 * | 10/2003 | Li et al. | 349/115 |
| 6,786,571 B2 * | 9/2004 | Fukumoto et al. | 347/43 |
| 6,814,426 B2 * | 11/2004 | Doll et al. | 347/43 |
| 6,834,948 B2 * | 12/2004 | Asano et al. | 347/102 |
| 6,959,986 B2 * | 11/2005 | Ushirogouchi et al. | 347/100 |
| 7,044,592 B2 * | 5/2006 | Sato et al. | 347/100 |
| 7,084,184 B2 | 8/2006 | Takabayashi | |
| 7,108,367 B2 * | 9/2006 | Ushirogouchi et al. | 347/102 |
| 7,119,130 B2 * | 10/2006 | Sasa | 522/170 |
| 7,125,112 B2 * | 10/2006 | Ushirogouchi et al. | 347/100 |
| 7,244,472 B2 * | 7/2007 | Takabayashi | 427/466 |
| 7,309,122 B2 * | 12/2007 | Nakajima et al. | 347/100 |
| 7,375,145 B2 * | 5/2008 | Akiyama et al. | 522/168 |
| 7,387,380 B2 * | 6/2008 | Ushirogouchi et al. | 347/102 |
| 7,473,720 B2 * | 1/2009 | Akiyama et al. | 522/168 |
| 7,500,745 B2 * | 3/2009 | Ushirogouchi et al. | 347/102 |
| 2002/0188033 A1 | 12/2002 | Maeda | |
| 2003/0231234 A1 | 12/2003 | Ushirogouchi et al. | |
| 2004/0041882 A1 * | 3/2004 | Konno et al. | 347/43 |
| 2004/0263597 A1 * | 12/2004 | Nelson et al. | 347/95 |
| 2004/0265520 A1 * | 12/2004 | Nakajima et al. | 428/34.1 |
| 2007/0263048 A1 * | 11/2007 | Okito et al. | 347/85 |

FOREIGN PATENT DOCUMENTS

| | | |
|---|---|---|
| EP | 0 844 255 A1 | 5/1998 |
| EP | 1 243 629 A1 | 9/2002 |
| EP | 1 357 159 A2 | 10/2003 |
| JP | 9-183928 A | 7/1997 |
| JP | 2000-135781 A | 5/2000 |
| JP | 2003-089261 A | 3/2003 |

\* cited by examiner

INK JET RECORDING APPARATUS

CROSS-REFERENCE TO RELATED APPLICATIONS

This application is a Divisional application of application Ser. No. 10/806,818 filed Mar. 22, 2004, now U.S. Pat. No. 7,417,074 the entire contents of which are incorporated herein by reference. This application is based upon and claims the benefit of priority from the Japanese Patent Application No. 2003-319841, filed Sep. 11, 2003, the entire contents of which are incorporated herein by reference.

BACKGROUND OF THE INVENTION

1. Field of the Invention

The present invention relates to a liquid ink and a recording apparatus. In particular, the present invention relates to an ink for an ink jet and to an ink jet recording apparatus.

2. Description of the Related Art

In a situation where a fairly large number of copies of printed matter are required such as in the cases of printing copies of local advertisement bill and enterprise handout, a printing machine utilizing a form plate has been conventionally employed for meeting such requirements. In recent years however, an on-demand printer which is capable of quickly coping with the diversification of needs and of minimizing stocks has been increasingly utilized in place of the aforementioned conventional printing machine. As for such an on-demand printer, an ink jet printer is expected to be useful as the ink jet printer is capable of achieving high-speed and high-quality printing.

With a view to achieve the printing of highly brilliant images by using an on-demand printer, there is known a technique to employ a solvent type ink or a solvent type liquid toner both containing a pigment and an organic solvent in the same manner as in the case of a printing machine utilizing a form plate. This technique however leads to the evaporation of organic solvent to such an extent that cannot be disregarded when the printing is repeated a certain number of times. Therefore, when this technique is employed, a problem of environmental contamination due to this evaporated organic solvent will be raised, thus necessitating the provision of an exhaust gas processing installation or a solvent recovery system.

Under the circumstances, a photosensitive ink and a printer system employing the photosensitive ink are now taken notice of as a technique which is effective in overcoming the aforementioned problem. In this technique, the photosensitive ink that has been migrated to the surface of printed matter photocures quickly. As for the photosensitive ink employed therein, the typical example comprises, as indispensable components, a radical polymeric monomer, a photopolymerization initiator and a pigment.

Since an ink layer formed of such a photosensitive ink can be readily nonfluidized by irradiation with light, it is possible, with the employment of this printing system, to obtain printed matter of relatively high quality. However, the ink employed therein contains a large quantity of carcinogens such as a radical-generating agent, and moreover, a volatile acrylic derivative employed as a radical polymeric monomer is highly skin-irritating and bad smelling. Namely, this photosensitive ink is required to be treated carefully. Further, the radical polymerization in the ink is obstructed greatly by the presence of oxygen in the atmosphere and at the same time, the exposure light is absorbed by the pigment included in the ink. Therefore, the dosage of exposure tends to become insufficient at a deep region of the layer of ink. As a result, the sensitivity of this photo-sensitive ink to the exposure light is relatively low so that a considerably sophisticated exposure system would be required in order to obtain printed matter of high quality in the employment of this printer system.

With a view to overcome these problems, there has been proposed a cationic curing type ink which cure through irradiation with an active energy beam. This cationic curing type ink can be employed in such a manner that it is discharged from an ink jet print head for instance to form a pattern of ink layer corresponding to a desired image on a recording medium and then, the resultant ink layer is subjected to irradiation with active energy such as ultraviolet rays or an electron beam to cure the ink layer.

However, there is a problem common to all kinds of photo-cationic curing type inks for an ink jet that the viscosity of the ink fluctuates considerably with time. The reason for this can be attributed to the fact that the ink is quite vulnerable to dark reaction. When the viscosity of ink fluctuates, the trajectory of ink would be disordered and the reproducibility of printing would be badly affected in the case of the ink for an ink jet in particular. In the worst case, critical situations such as discharge failure or clogging of ink would be caused to occur. Therefore, the fluctuation in viscosity of ink is one of very serious problems. No one has succeeded as yet to find an effective measure to solve this problem of increase in viscosity of the ink for an ink jet.

Photo-cationic curing type inks for ink-jet containing an oxirane group-containing compound, an oxetane ring-containing compound, a vinylether compound, a pigment, a pigment-dispersing agent, photo-acid generating agent and other additives are liable to indicate a great magnitude of fluctuation in viscosity (increase in viscosity) with time due to the dark reaction of the inks for an ink jet which would take place quite prominently. Therefore, the photo-cationic curing type inks for an ink jet are poor in shelf life and hence short in useful life.

BRIEF SUMMARY OF THE INVENTION

Therefore, one of the objects of the present invention is to provide an ink for an ink jet which is excellent in shelf life and capable of reliably obtaining high-quality printed matter with excellent reproducibility.

Another object of the present invention is to provide an ink jet recording apparatus which is capable of reliably producing high-quality printed matter with excellent reproducibility.

According to one aspect of the present invention, there is provided an ink for an ink jet comprising:

a first solution containing a solvent which is polymerizable in the presence of an acid and a colorant dispersed in the solvent; and a second solution containing a photo-acid generating agent which is capable of generating an acid as it is irradiated with light and prepared separate from the first solution, the second solution being preserved separate from the first solution.

According to another aspect of the present invention, there is provided an ink jet recording apparatus comprising:

a color ink container having a capacity V1 accommodating therein a solvent which is polymerizable in the presence of an acid and a colorant dispersed in the solvent;

a reaction liquid container having a capacity V2 (V2<V1) accommodating therein a reaction liquid comprising a solvent, and a photo-acid generating agent which is dissolved in the solvent and capable of generating an acid as it is irradiated with light;

a stirring container mixing the color ink and the reaction liquid at a mixing ratio of S1:S2 (the color ink:the reaction liquid) to prepare a recording ink;

a color ink supply means feeding the color ink from the color ink container to the stirring container;

a reaction liquid supply means feeding the reaction liquid from the reaction liquid container to the stirring container;

an ink jet recording head ejecting the recording ink to a recording medium; and a supply tube feeding the recording ink to the recording head.

Additional objects and advantages of the invention will be set forth in the description which follows, and in part will be obvious from the description, or may be learned by practice of the invention. The objects and advantages of the invention may be realized and obtained by the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
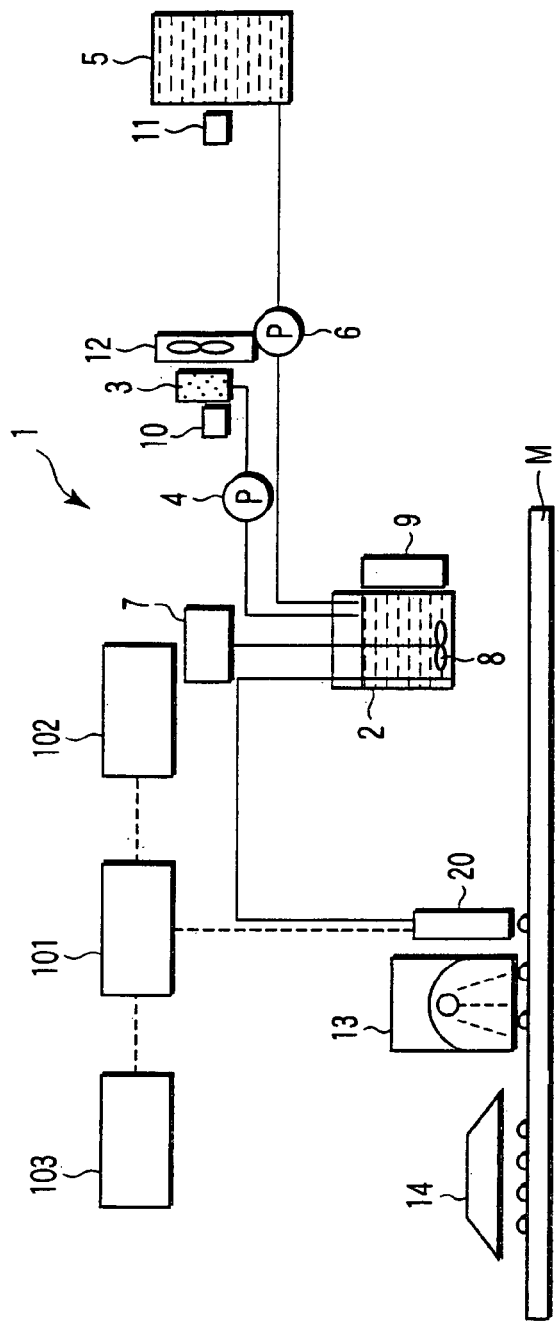
FIG. 1 is a diagram schematically illustrating an ink jet recording apparatus according to one embodiment of the present invention.

Next, various embodiments of the present invention will be explained in detail as follows.

The ink for ink jet according to one embodiment of the present invention is formed of two solutions which should be separately prepared and separately preserved. A first solution comprises a solvent which is polymerizable in the presence of an acid and a colorant dispersed in the solvent, while a second solution contains a photo-acid generating agent which is capable of generating an acid as it is irradiated with light, the photo-acid generating agent being dissolved in a solvent.

When this ink for ink jet is employed in an ink jet recording apparatus according to one embodiment of the present invention, these two solutions which have been separately preserved in separate containers respectively are mixed together immediately before introduced into an ink jet type recording head. Namely, after being sufficiently mixed together through stirring, the ink consisting of a mixture of these two solutions is fed to the ink jet type recording head and ejected onto a recording medium. The ink which is ready for this ejection will be referred to as "recording ink" in this specification.

The recording ink will be ejected onto a recording medium so as to form a pattern of ink layer which corresponds to a desired image. As this ink layer is irradiated with light, an acid generates from the photo-acid generating agent, thus enabling this acid to function as a catalyst for the crosslinking reaction of the polymerizable compound (solvent). Further, the acid thus generated diffuses into the ink layer. Moreover, the crosslinking reaction under the condition where the acid is diffused and employed as a catalyst can be accelerated by heating the ink layer. In contrast to radical polymerization, this crosslinking reaction cannot be obstructed by the presence of oxygen. Therefore, it is possible to enable a plurality of crosslinking reactions to take place with a single photon, thereby making it possible to perform the crosslinking reaction with high sensitivity. Additionally, it is possible to take place the crosslinking reaction quickly even in a deep region of the ink layer or in the interior of the light absorptive recording medium.

Accordingly, when this recording ink is employed, it is possible to quickly unfluidize the ink layer by the irradiation of light and heating after an ink layer has been formed through the ejection thereof onto the surface of a printed matter. Namely, it is now possible to obtain a printed matter of high quality without necessitating a considerably sophisticated exposure system.

Furthermore, according to this embodiment, the aforementioned polymerizable compound is employed as at least part of the solvent, more typically, almost all of the solvent is constituted by a polymerizable compound. In this manner, if the ratio of a polymerizable compound in the solvent is sufficiently high, there is a little possibility of volatilizing an organic solvent during the printing process. Therefore, the problem of atmospheric contamination due to the volatilization of organic solvents can be overcome, thus obviating the provision of an exhaust gas processing installation or a solvent recovery system.

Additionally, according to this embodiment, an organic solvent is no longer required to be employed and moreover, the ink layer can be quickly nonfluidized. As a result, an image can be easily fixed onto the printing surfaces of various differing in characteristics without substantially causing the generation of bleeding. Moreover, it is possible to suppress the deterioration of the printed surface that may be otherwise caused to occur concomitant with the drying process of the ink layer. Furthermore, since the ink for ink jet according to this embodiment is capable of containing a high concentration of a pigment as a coloring component, it is possible to form a printed pattern which is quite clear and excellent in weathering resistance.

Next, all of the solutions constituting the ink for ink jet according to this embodiment of the present invention will be respectively explained in detail.

The first solution comprises a solvent which is polymerizable in the presence of an acid and a colorant dispersed in the solvent, this first solution being referred to also as a color ink.

As for the solvent which is polymerizable in the presence of an acid, it is possible to employ compounds having a viscosity of 30 mPa·s or less under the conditions of ordinary temperature and atmospheric pressure and having a boiling point of 150° C. or more, more preferably, having a boiling point of 180° C. or more. Specific preferable examples of such compounds include those having a molecular weight of not more than 1000 and at least a cyclic ether group such as epoxy group, oxetane group, oxolane group, etc. Further, it is also possible to jointly use acrylic or vinyl compounds having the aforementioned substituent groups on their side chains; carbonate-based compounds; low molecular melanin compounds; monomers having a cationically polymerizable vinyl linkage such as vinyl ethers, vinyl carbazoles, styrene derivatives, alfa-methylstyrene derivatives, and vinyl alcohol esters such as esters between vinyl alcohol and acrylic acid, methacrylic acid, etc.

Among these compounds, polymerizable compounds which are capable of crosslinking in the presence of an acid and constituted by an aliphatic skeleton or an alicyclic skeleton are advantageous in that when these polymerizable compounds are employed together with the aforementioned other components, the transparency of the recording ink would be enhanced in the step of exposure and moreover it is possible to provide the ink layer with a suitable degree of thermoplasticity and resolubility after the curing thereof. As a result, the sensitivity, fixing property, transferring property and maintenance of the color ink can be enhanced. In particular, when epoxy compounds having an alicyclic skeleton are employed as a polymerizable compound, it is possible, in addition to an enhanced reactivity, to increase the boiling point of the ink to a certain extent while retaining low viscosity of the ink.

On the other hand, in a situation where it is especially demanded to accelerate the curing velocity of the ink according to this embodiment of the present invention, for example, where as high velocity of printing as several tens meters per minute is demanded, it is desirable to employ oxetane compounds. Since the oxetane compounds are capable of promoting and accelerating the curing of the ink, the primary curing of the ink can be accelerated. However, since the thermoplasticity of the ink is caused to decrease in this case, the heat transferring property thereof tends to deteriorate as the quantity of adding the oxetane compounds is increased. Therefore, the quantity of oxetane compounds should preferably be within the range of 10 to 40 parts by weight based on the entire quantity of the solvent. If the oxetane compounds are added more than or less than this range, the curing of the ink would not be accelerated or otherwise the clogging of nozzle or insufficient thermoplasticity of ink is likely to be resulted.

As for the oxetane compounds that can be employed herein, specific examples thereof include 1,4-bis[(1-ethyl-3-oxetanyl)methoxy]benzene, 1,3-bis[(1-ethyl-3-oxetanyl)methoxy]benzene, 4,4'-bis[(3-ethyl-3-oxetanyl)methoxy]biphenyl, phenol novolac oxetane, oxetanyl silsesquioxane, Allonoxetane OXT-101 and OXT-102 (Toa Gosei Co., Ltd.), 1,4-bis[(1-ethyl-3-oxetanyl)methoxy]cyclohexane, 1,4-bis[(3-ethyl-3-oxetanyl)methoxy]cyclohexane, 1,2-bis[(1-ethyl-3-oxetanyl)methoxy]norbornane, aliphatic or alicyclic compounds having at least two oxetane groups, and acrylic or methacrylic compounds having oxetane group on their side chains.

If it is demanded to lower the viscosity of the ink in addition to the demand to increase the curing velocity of the ink, it is preferable to further incorporate a vinyl ether compound into the ink. When a vinyl ether compound is incorporated into the ink, the curing velocity of the ink can be enhanced without extremely enhancing the volatility of the ink and at the same time, the viscosity of the ink can be lowered.

As for such a vinyl ether compound, it is possible to employ compounds having vinyl group which is bonded, through ether linkage, to (p+1)-valent group including benzene ring, naphthalene ring and biphenyl ring; or to (p+1)-valent group to be derived from cycloalkane skeleton, norbornane skeleton, adamantane skeleton, tricyclodecane skeleton, tetracyclododecane skeleton, terpenoid skeleton, and cholesterol skeleton. More specifically, it is possible to employ polyvinyl-etherified compounds of cyclohexane, norbornane, tricyclodecane, adamantine, benzene or naphthalene.

If it is required to provide a printed matter with solvent resistance such as alcohol resistance in the employment of the ink composition according the embodiment of the present invention, it is preferable to incorporate a compound having an aromatic skeleton. Since it is possible, through the employment of a compound having an aromatic skeleton, to promote and accelerate the curing, the durability of the printed matter would be enhanced. Among the compounds having an aromatic skeleton, it is more preferable to employ oxetane compounds having an aromatic skeleton whose valency is 2 or more or vinylether compounds having an aromatic skeleton whose valency is 2 or more. Specific examples of such oxetane compounds include 1,4-bis[(1-ethyl-3-oxetanyl)methoxy]benzene, 1,3-bis[(1-ethyl-3-oxetanyl)methoxy]benzene, 4,4'-bis[(3-ethyl-3-oxetanyl)methoxy]biphenyl, phenol novolac oxetane, and alicyclic compounds having at least two oxetane groups.

The first solution may contain a little quantity of a compound of high viscosity as part of the solvent, specific examples of such a compound including those having a relatively high molecular weight and being solid at normal temperatures. When this kind of compound is additionally incorporated into the ink, the flexibility of the ink layer after curing or the dispersibility of pigments can be enhanced. Further, when a compound large in number of valency and high in reactivity is employed in this case, it would be possible to enhance the hardness and solvent resistance of the cured products to be derived therefrom.

Examples of such a viscous compound include compounds having a molecular weight of not more than 5000 and containing cyclic ether group such as epoxy group, oxetane group, oxolane group, etc., which are bonded through a long chain alkylene group; acrylic or vinyl compounds having the aforementioned substituent groups on their side chains; carbonate-based compounds; low molecular melanin compounds; monomers having cationically polymerizable vinyl linkage; and oligomers to be derived from the polymerization of one or more such monomers; specific examples of such monomers and oligomers including vinyl ethers, vinyl carbazoles, styrene derivatives, alfa-methylstyrene derivatives, and vinyl alcohol esters such as esters between vinyl alcohol and acrylic acid, methacrylic acid, etc.

In addition to the aforementioned compounds, the solvent constituting the first solution may further contain a homopolymer or copolymer of vinyl alcohol; acid-reactive/dehydrocondensing resins having OH group, COOH group, acetal group, etc. the molecular weight thereof being 5000 or less; acid-reactive/dehydrocondensing polycarbonate resins having a molecular weight thereof being 5000 or less; copolymers be derived from a reaction between polyamic acid, polyamino acid or acrylic acid and a vinyl compound having an acid polymerizable double bond on its side chain; copolymers to be derived from a reaction between vinyl alcohol and a vinyl compound having an acid polymerizable double bond on its side chain; and methylol melamine resin.

Since the ink according to this embodiment of the present invention is a photosensitive ink which needs to be heated, the volatility of ink should preferably be as low as possible in terms of safety and odor. For example, the volatilizing speed of the ink after the exposure process thereof and at a temperature of 80° C. should preferably be not higher than 0.2 mg/cm$^2$·min. The quantity of volatilization herein represents a quantity (mg) of volatilized ink per minute as measured when a container containing the ink and having an opening area of 10 cm$^2$ is heated. Although this value of volatilization varies depending on the size of opening of the container, it is generally defined by measuring a value under the condition where 4 g of ink is placed in a Petri dish having a diameter of 6 cm and heated under atmospheric pressure. If the ink is formulated falling outside this range of volatility, the volatilizing speed of the ink would become too high in the heating step thereof so that the environmental safety would be damaged and the problem of odor would become serious. On the other hand, if the volatility of the ink is extremely minimal, for example if the volatilizing speed of the ink is 0.00001 mg/cm$^2$·min or less, the viscosity of the ink would become too high in general so that the discharge of ink jet would become difficult in most cases.

If the ink layer has a sufficient thermoplasticity and resolubility after the curing thereof, it is possible to enable this ink layer to be transferred onto a recording medium after a recording ink has been discharged on an image carrier to form the ink layer. More specifically, first of all, an ink layer is formed by discharging a recording ink on the image carrier and the resultant ink layer is subjected to irradiation of light and heating to cure or preliminarily cure the ink layer. Then, under the condition where a recording medium is kept contacted with a recording medium, only pressure or both of pressure and heating are applied to the ink layer to refluidize or plasticize the ink layer. As a result, the ink layer is transferred onto a recording medium. On the other hand, if it is desired that the recording ink is directly discharged onto a recording medium, an ink layer is formed on the recording medium at first and then, subjected to irradiation of light and heating to cure or preliminarily cure the ink layer. Then, the resultant ink layer is further subjected to heating to completely cure the ink layer, thus making it possible to fix the ink layer onto the recording medium.

When a compound comprising an aliphatic skeleton or an alicyclic skeleton each having a cyclic ether group such as epoxy group, oxetane group and oxolane group is employed as the aforementioned polymerizable compound, it would be possible fundamentally to provide the ink layer with a suitable degree of thermoplasticity and re-solubility after the curing process of the ink layer. In particular, it is preferable to employ polymerizable compounds having epoxy group and being excellent in acidic polymerizabilities. Examples of such compounds include those having a bivalent aliphatic or alicyclic hydrocarbon group having 1 to about 15 carbon atoms, or those having epoxy group or alicyclic epoxy group on one or both of bivalent group having partially an aliphatic chain or an alicyclic skeleton.

Although there is not any particular limitation with regard to the number of epoxy group to be introduced into the aforementioned molecular skeleton, it is preferable that the number of valency should be at most two or three in order to provide the ink layer with flexibility and resolubility after the curing thereof. As for the examples of such polymerizable compounds, the compounds represented by the following general formulas (1) and (2) can be employed.

$$R1-A1-R2 \quad (1)$$

$$R3-A2 \quad (2)$$

In these general formulas (1) and (2), R1, R2 and R3 represent individually epoxy group or epoxy group having an alicyclic skeleton; and A1 and A2 represent respectively a functional group.

The compounds represented by the general formulas (1) and (2) are generally low in viscosity, i.e. ranging from 1 cP to about 30 cP. Therefore, the incorporation of these compounds of low viscosity into the ink is effective in sufficiently lowering the viscosity of the ink.

Further, the alicyclic epoxy compounds represented by the following general formula (3) are generally high in viscosity, i.e. ranging from 20 cP to about 500 cP. Therefore, the incorporation of these compounds of high viscosity into the ink is effective in providing the ink layer with flexibility or on the contrary with hardness.

$$R4-A3-(R5)_k \quad (3)$$

In this general formula (3), R4 and R5 represent individually epoxy group or epoxy group having an alicyclic skeleton; and A3 represents (k+1)-valent functional group (k is natural number) having at least alkylene group and/or alicyclic skeleton.

The aforementioned compounds of low or high viscosity should preferably be employed in such a manner that at least one low viscosity compounds is mixed together with at least one high viscosity compounds. For example, when 5 to 90 parts by weight of low viscosity compound is mixed with 1 to 40 parts by weight of high viscosity compound per 100 parts by weight of the first solution, it would become advantageous in realizing a lowest minimum fluidity which is required for the discharge of the ink (i.e. a viscosity of 30 cP or less at a temperature of 50° C.). In particular, it is preferable to mix the compounds represented by the general formulas (1) and (2) with the compounds represented by the general formula (3) at a weight ratio of about 1:1 to 10:1.

As for the examples of the aforementioned aliphatic epoxy compounds, it is possible to employ alicyclic epoxy compounds such as Celloxide 2021, Celloxide 2021A, Celloxide 2021P, Celloxide 2081, Celloxide 2000 and Celloxide 3000 (DAICEL chemical Industries Ltd.); (metha)acrylate compounds having epoxy group, such as Cyclomer A200 and Cyclomer M100; methacrylate having methylglycidyl group such as MGMA; glycidol representing a low molecular epoxy compound; β-methylepichlorohydrin; α-pinene oxide; α-olefin monoepoxide having 12 to 14 carbon atoms; α-olefin monoepoxide having 16 to 18 carbon atoms; epoxidized soy bean oil such as Dimac S-300K; epoxidized linseed oil such as Dimac L-500; and polyfunctional epoxy compounds such as Epolead GT301 and Epolead GT401. It is also possible to employ alicyclic epoxy compounds (such as Cylacure; Dow Chemical Co., Ltd, U.S.); low molecular weight phenol compounds which are hydrogenated and aliphatized with terminal hydroxyl group thereof being substituted by a group having epoxy; glycidyl ether compounds of aliphatic alcohol/alicyclic alcohol such as ethylene glycol, glycerin, neopentyl alcohol, hexanediol, trimethylol propane; and glycidyl esters of hexahydrophthalic acid or hydrogenated aromatic polyhydric carboxylic acid. Further, to improve the chemical resistance of the printed image, the ink may includes, for example, epoxidized polybutadiene such as Epolead PB3600 and PB3600M (trademark, DAICEL Chemical Industries, Ltd.); or transparent liquid epoxy resins excellent in weathering resistance and high in Tg such as EHPE3150 and EHPE3150CE (trademark, DAICEL Chemical Industries, Ltd.). In addition to these epoxy resins, it is also possible to incorporate lactone-modified alicyclic epoxy resin, examples of which including Placcell GL61, GL62, G101, G102, G105, G401, G402, G403, etc.

Among them, it is preferable, in terms of viscosity and volatility, to employ Celloxide 2000, Celloxide 3000, or compounds to be derived from the modification of alcohols such as α-pinene oxide ethylene glycol, glycerine, neopentyl alcohol and hexanediol into glycidyl ethers.

If the alicyclic skeleton included in said epoxy compounds has terpenoid skeleton, the safety of the ink layer after the curing thereof with regard to human body or environments, would be enhanced. Examples of epoxy compounds include epoxidized compounds to be derived from the oxidation of unsaturated linkage of terpene-based compounds having unsaturated linkage such as myrcene, ocimene, geraniol, nerol, linalol, citrorenol, citral, menthene, limonene, dipentene, terpinolene, terpinene, phellandrene, sylvestrene, piperithol, terpineol, menthenemonol, isopregol, perary aldehyde, piperitone, dihydrocarvone, carvone, pinol, ascaridole, sabinene, careen, pinene, bornene, fenchene, camphene, carveol, sesquiterpene, diterpene, triperpene, etc. Further, epoxy compounds to be derived through the oxidation of norbornene compounds existing in a large amount in nature would be advantageous in terms of cost.

Incidentally, the oxidation of the aforementioned compounds into epoxy compounds can be performed by using various oxidation procedures utilizing an oxidizing agent such as peracetic acid. Among them, an air oxidation method employing N-hydroxy phthalimide and a rare earth catalyst, as shown in JP Laid-open Patent Publication (Kokai) No. 11-49764 (1999) would be most suited for use in this case.

The compound to be polymerized in the presence of the aforementioned acids can be suitably selected depending on the photo-acid generating agent included in the second solution to be explained hereinafter. In this case, the quantities of all of the components should be suitably adjusted so as to enable a recording ink to contain predetermined quantities of these components. For example, if a compound to be polymerized in the presence of an acid in the first solution is to be constituted by a mixture consisting of 30 to 70 parts by weight of alicyclic epoxy compound having terpenoid skeleton or norbornane and 30 to 70 parts by weight of an epoxy compound comprising an aliphatic skeleton having two or more glycidyl ether groups each having not more than 6 carbon atoms, a color component can be incorporated into the ink at a ratio of 1 to 10 parts by weight. As for the photo-acid generating agent in the second solution, it is preferable to employ a hexafluorophosphate compound having a phenylsulfonium skeleton and to mix the first solution and the second solution in such a manner that the content of the photo-acid generating agent in the recording ink becomes 1 to 10 parts by weight. If the ink is formulated in this manner, it would be possible to provide the ink with not only excellent photosensitivity but also suitable degrees of hardness, adhesion and transferring property.

As for the alicyclic epoxy compounds, it is possible to employ limonene (di)oxide, (di)oxabicycloheptane and the substituted compounds thereof. As for the epoxy compounds having not more than 6 carbon atoms, specific examples thereof include neopentylglycol diglycidyl ether, ethyleneglycol diglycidyl ether, glycerol diglycidyl ether, glycerol triglycidyl ether, 1,6-hexanediol diglycidyl ether, etc. Among them, a combination of limonene dioxide with neopentylglycol diglycidyl ether would be most preferable. Incidentally, if the number of carbon atom exceeds over 6 in the epoxy compounds, the hardness, adhesion and transferring property of the ink may be deteriorated.

If an epoxy compound formed of the aforementioned combination is employed, the ink layer that has been cured can be refluidized as it is heated at least to a temperature of 50° C., more preferably 80° C. or more, the fixing and transferring of the ink layer can be suitably performed. In this case, the ink layer that has been cured can be resolubilized in liquid ink or in an organic solvent formed of lower alcohol such as relatively stable ethanol or formed of low boiling point petroleum components such as isoper. Accordingly, it is possible to suppress the generation of the clogging of nozzle, or even if the clogging of nozzle is generated, the clogging can be easily extinguished. Namely, the maintenance of nozzle head can be greatly improved.

However, the characteristics demanded of printed matter differ depending on the intended use thereof. For example, if a printed matter is to be employed for the facing of a can or PET (polyethylene terephthalate) bottle or for the facing of a container formed of oily materials, the first solution may contain, in addition to the aforementioned epoxy compounds, compounds having phenolic hydroxyl group, glycidyl ether compounds of bisphenol A for instance, glycidyl ether compounds of phenolic oligomer such as phenol novolac and polyhydroxy styrene, ordinary aromatic epoxy compounds such as styrene oxide, or oxetane compounds having an aromatic skeleton. Alternately, the first solution may contain, in order to enhance the density of crosslinking, polyhydric epoxy compounds of not less than tri-valence or polyhydric vinyl ether compounds of not less than tri-valence.

The first solution can be prepared by dispersing a color component in a solvent which is polymerizable in the presence of the aforementioned acids.

As for the color components, it is possible to employ pigments and/or dyes. However, since acids are employed in this embodiment of the present invention, pigments are more preferable for use rather than dyes which may be easily discolored by the effects of acids.

As for the pigments useful as a color component in this case, there is not any particular limitation as long as they have photo-coloring and tinting properties demanded of pigments. The pigments to be employed in this case may be further provided with other properties such as magnetism, fluorescence, conductivity, dielectric property, etc. in addition to the coloring and tinting properties. If the pigments are provided with these various properties, it may become possible to obtain an image having various functions. Further, the pigments may contain particles which are effective in providing an ink layer with increased heat resistance or physical strength.

As for the examples of pigments useful in this case, they include photo-absorption pigments for example. Specific examples of such photo-absorption pigments include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; and pigments formed of metal powder such as aluminum powder, bronze powder and zinc powder.

Further, as for the examples of the pigments, they include, for example, dye chelate (basic dye type chelate, acidic dye type chelate, etc.); nitro pigments; nitroso pigments (including aniline black, naphtole green B), azo pigment (including azo lake, insoluble azo pigment, condensed azo pigment, chelate azo pigment) such as Bordeaux 10B, Lake red 4R and chromophthal red; Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridine pigment; and organic pigments such as isoindolinone pigment.

As for the pigments that can be employed in a black ink, examples thereof include carbon black such as Raven 5750, Raven 5250, Raven 5000, Raven 3500, Raven 1255 and Raven 700 (Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (Cabot Co., Ltd.); No. 2300, No. 900, MCF88, No. 33, No. 40, No. 45, No. 52, MA7, MA8, MA100 and No. 2200B (Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (Dexa Co., Ltd.).

As for the pigments that can be employed in a yellow ink, examples thereof include Yellow 128, C.I. Pigment Yellow 129, C.I. Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114 and C.I. Pigment Yellow.

As for the pigments that can be employed in a magenta ink, examples thereof include C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, and C.I. Pigment Red 112.

Further, as for the pigments that can be employed in a cyanine ink, examples thereof include C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4, and C.I. Vat Blue 60.

Further, it is also possible to employ white pigments such as natural clay, metal carbonates such as white lead, zinc white and magnesium carbonate; metal oxides such as barium and titanium. The recording ink containing white pigments can be employed not only in white printing but also in the amendments of printing or underlying images through overwriting.

As for fluorescent pigments, it is possible to employ either inorganic fluorescence materials but also organic fluorescence materials. As for the inorganic fluorescence materials, specific examples of which include $MgWO_4$, $CaWO_4$, $(Ca, Zn)(PO_4)_2:Ti^+$, $Ba_2P_2O_7:Ti$, $BaSi_2O_5:Pb^{2+}$, $Sr_2P_2O_7:Sn^{2+}$, $SrFB_2O_{3.5}:Eu^{2+}$, $MgAl_{16}O_{27}:Eu^{2+}$, and inorganic acid salts such as tungstenate and sulfate. As for the organic fluorescence materials, specific examples of which include acridine orange, amino acridine, quinacrine, anilinonaphthalene sulfonate derivatives, anthroyl oxystearic acid, auramine O, chlorotetracycline, cyanine dye such as merocyaninen and 1,1'-dihexyl-2,2'-oxacarboxycyanine, dansyl sulfonamide, dansyl choline, dansyl galactoside, dansyl tolidine, dansyl chloride derivatives such as dansyl chloride, diphenyl hexatriene, eosin, ∈-adenosine, ethidium bromide, fluorescein, foamycine, 4-benzoylamide-4'-aminostilbene-2,2'-sulfonic acid, β-naphthyl triphosphic acid, oxonol dye, parinaric acid derivatives, perylene, N-phenylnaphthyl amine, pyrene, safranine O, fluorescamine, fluorescein isocyanate, 7-chloronitrobenzo-2-oxa-1,3-diazole, dansylaziridine, 5-(iodoacetamide ethyl) aminonaphthalene-1-sulfonic acid, 5-iodofluorescein, N-(1-anilinonaphthyl 4) maleimide, N-(7-dimethyl-4-methyl cumanyl) maleimide, N-(3-pirene) maleimide, eosin-5-iodoacetamide, fluorescein mercury acetate, 2-[4'-(2"-iodoacetamide)]aminonaphthalene-6-sulfonic acid, eosin, Rhodamine derivatives, organic EL dye, organic EL polymer, organic EL crystal and dendrimer.

As for the powder to be employed for enhancing the heat resistance and physical strength of ink layer, examples of which include oxides or nitrides of aluminum and silicon, filler and silicon carbide. For the purpose of providing the ink layer with electric conductivity, the ink may further contain conductive carbon pigment, carbon fiber, or powder of copper, silver, antimony and other noble metals. Iron oxide powder and ferromagnetic powder are suited for use in providing the ink layer with magnetic property. It is also possible to incorporate metal oxide powder such as tantalum oxide or titanium oxide having high dielectric constant into the recording ink.

It is also possible to incorporate dyes as an auxiliary component of pigment into the ink. For example, dyes which are low in acidity and basicity and excellent in solubility to epoxy, such as azoic dye, sulfur (building materials) dye, disperse dye, fluorescent brightening agent and oil soluble dye can be employed in general. Among them, it is more preferable to employ oil soluble dye such as azo dye, triaryl methane dye, anthraquinone dye and azine dye. Specific examples of such oil soluble dye include C.I. Solvent Yellow-2, 6, 14, 15, 16, 19, 21, 33, 56, 61 and 80; Diaresin Yellow-A, F. GRN and GG; C.I. Slovent Violet-8, 13, 14, 21 and 27; C.I. Disperse Violet-1; Sumiplast Violet RR; C.I. Slovent Blue-2, 11, 12, 25 and 35; Diresin Blue-J, A, K and N; Orient Oil Blue-IIN, #603; and Sumiplast Blue BG.

These pigments and dyes describe above may be employed singly or in combination of two or more. For the purpose of enhancing the photoabsorbance, saturation and color vision, these pigments and dyes may be employed jointly. Further, in order to enhance the dispersibility of pigments, the pigments may be subjected to treatments for combining them with a polymer binder or for micro-capsulation.

The content of these pigments in the ink according to this embodiment of the present invention should preferably be within the range of 1 to 25% by weight. If the content of these pigments is less than 1% by weight, the color density would become too low. On the other hand, if the content of these pigments is higher than 25% by weight, the discharging property of the ink would be deteriorated. Further, the content of the powder components in the ink should preferably be within the range of 1 to 50% by weight. If the content of the powder components is less than 1% by weight, it would become difficult to expect sufficient effects of enhancing the sensitivity of the ink. On the other hand, if the content of the powder components is higher than 50% by weight, the resolution and sensitivity of the ink would be deteriorated. The content of these additives in the first solution should be optionally selected so as to enable the recording ink having the second solution mixed therein to contain suitable quantities of these pigments, etc. which are defined above.

The particle diameter of these pigments and dyes should be as small as possible. Generally, an average particle diameter of these pigments and dyes is confined to not larger than ⅓, more preferably not larger than about ⅒ of the diameter of the opening of nozzle through which the recording ink is discharged. Incidentally, the diameter of the opening of nozzle is typically not larger than 10 μm, more preferably not larger than 5 μm. Therefore, a preferable particle diameter of these pigments and dyes should be not larger than 0.35 μm if they are to be employed in printing ink.

For the purpose of enhancing the dispersibility of pigments, etc., the first solution may contain a small quantity of dispersing agents such as nonionic or ionic surfactants and antistatic agents. Further, it is also possible to suitably employ polymer type dispersing agents such as acryl and vinyl alcohol having characteristics similar to the aforementioned surfactants. However, if it is desired to employ a cationic dispersant as a dispersing agent, it is advisable to select those having a lower acidity than that of carboxylic acids. Because, some of cationic dispersants may promote the dark reaction to cure the ink. Further, since dispersants and dyes which are strong in basicity also act not only to deteriorate the sensitivity of the ink but also to promote the dark reaction to cure the ink, these dispersants and dyes should be selected from those which are close to neutral or nonionic in nature.

The first solution containing a color component should preferably be formulated to further contain, as a viscosity stabilizing agent, a basic compound and/or a basicity-adjusting compound. If carbon black is employed as a color component, the effect of these viscosity stabilizing agents would be further promoted. Moreover, since the basic compound is capable of concurrently effectively protecting not only the interior of the ink jet head of recording apparatus but also the metal portions of the piping for the ink from being eroded by acids, the employment of the basic compound is preferable in any kinds of the inks for ink jet according to this embodiment of the present invention.

As for the basic compound, it is possible to employ inorganic basic materials and organic basic materials which are capable of being dissolved in a compound to be polymerized in the presence of an acid. However, in view of solubility, the employment of organic basic materials is more preferable. Specific examples of such organic basic materials include ammonia compound, ammonium compounds, substituted or unsubstituted alkylamine, substituted or unsubstituted aromatic amine, pyridine, pyrimidine, and organic amines having a hetrocyclic skeleton such as imidazole. More specific examples of such organic basic materials include n-hexyl amine, dodecyl amine, aniline, dimethyl aniline, diphenyl amine, triphenyl amine, diazabicyclooctane, diazabicycloundecane, 3-phenyl pyridine, 4-phenyl pyridine, lutidine, 2,6-di-t-butylpyridine, and sulfonyl hydrazides such as 4-methylbenzene sulfonyl hydrazide, 4,4'-oxybis(benzenesulfonyl hydrazide) and 1,3-benzenesulfonyl hydrazide. Ammonium compounds can be also employed as a basic compound. These basic compounds can be employed singly or in combination of two or more kinds.

However, if a basic compound which is very strong in basicity such as imidazole is employed in this case, polymerization with time may be caused to occur or otherwise, a side reaction such as decomposition of photo-acid generating agent may be likely to take place. On the other hand, if a basic compound which is very weak in basicity is employed in this case, it would become difficult to sufficiently secure the effect of stabilizing the viscosity of ink through the addition of the basic compound. For example, the base dissociation constant pKb of the basic compound at a temperature of 25° C. and under the condition where the basic compound is in a state of suitable aqueous solution should preferably be 4 or more. However, if this pKb is higher than 11 in a basic compound, such a compound would be incapable of exhibiting the effect of stabilizing the viscosity of ink. Examples of basic compounds which are capable of satisfying the afore-mentioned conditions are pyridine derivatives, aniline derivatives, aminonaphthalene derivatives, other nitrogen-containing heterocyclic compounds and the derivatives thereof.

Specific examples of the pyridine derivatives include 2-fluoropyridine, 3-fluoropyridine, 2-chloropyridine, 3-chloropyridine, 3-phenylpyridine, 2-benzylpyridine, 2-formylpyridine, 2-(2'-pyridyl) pyridine, 3-acetylpyridine, 2-bromopyridine, 3-bromopyridine, 2-iodopyridine, 3-iodopyridine, and 2,6-di-tert-butylpyridine.

Specific examples of the aniline derivatives include aniline, 4-(p-aminobenzoyl)aniline, 4-benzylaniline, 4-chloro-N,N-dimethylaniline, 3-5-dibromoaniline, 2,4-dichloroaniline, N,N-dimethylaniline, N,N-dimethyl-3-nitroaniline, N-ethylaniline, 2-fluoroaniline, 3-fluoroaniline, 4-fluoroaniline, 2-iodoaniline, N-methylaniline, 4-methylthioaniline, 2-bromoaniline, 3-bromoaniline, 4-bromoaniline, 4-bromo-N,N-dimethylaniline, 2-chloroaniline, 3-chloroaniline, 4-chloroaniline, 3-chloro-N,N-dimethylaniniline, 3-nitroaniline, 4-nitroaniline, 2-methoxyaniline, 3-methoxyaniline, diphenylamine, 2-biphenylamine, o-toluidine, m-toluidine, p-toluidine, 3,3'-diaminodiphenyl sulfone, 4,4'-diaminodiphenyl sulfone, and 4,4'-bis(4-aminophenoxy) diphenyl, sulfone.

Specific examples of the aminonaphthalene derivatives include, for example, 1-amino-6-hydroxynaphthalene, 1-naphthylamine, 2-naphthylamine, diethylaminonaphthalene, and N-methyl-1-naphthylamine.

Specific examples of other nitrogen-containing heterocyclic compounds and the derivatives thereof include, for example, cinnoline, 3-acetylpiperidine, pyrazine, 2-methylpyrazine, methylaminopyrazine, pyridazine, 2-aminopyrimidine, 2-amino-4,6-dimethylpyrimidine, 2-amino-5-nitropyrimidine, 2,4,6-triamino-1,3,5-triazine, pyrrol, pyrazole, 1-methylpyrazole, 1,2,4-triazole, indazole, benzotriazole, quinazoline, quinoline, 3-aminoquinoline, 3-bromoquinoline, 8-carboxyquinoline, 3-hydroxyquinoline, 6-methoxyquinoline, 5-methylquinoline, quinoxaline, thiazole, 2-aminothiazole, 3,4-diazaindole, purine, 8-azapurine, indole and indolizine.

Among them, the employment of aniline derivatives as the aforementioned basic compound is especially preferable in terms of viscosity stability, volatility, basicity and low side-reaction.

However, since the aforementioned aniline compounds are relatively low basicity, the employment thereof in combination with a monomer having oxetane group and generally exhibiting basicity per se is not preferable. It is preferable to select, from oxetane compounds, a compound exhibiting such a high basicity that the pKb thereof at 25° C. is confined within the range of 3 to 7. For example, basic compounds such as amine having an aliphatic skeleton or amine having an alicyclic skeleton can be suitably employed.

The ink according to this embodiment of the present invention is heated subsequent to the step of exposure, the volatility of the basic compounds should preferably be as low as possible. More specifically, the boiling point of the basic compounds preferably is 150° C. or more, more preferably 180° C. or more under the ordinary pressure.

In order to secure the viscosity stabilizing effect of ink without considerably sacrificing the sensitivity thereof, the content of the basic compounds or the basicity-adjusting compounds preferably is confined within the range of 1 to 30 mol % based on the total molar quantity of the photo-acid generating agent in the recording ink. More preferably, the content of the basic compounds or the basicity-adjusting compounds is confined within the range of 2 to 15 mol % based on the photo-acid generating agent. The content and mixing ratio of these compounds in the first solution should be suitably adjusted so as to enable the recording ink having the second solution mixed therein to contain suitable quantities of these compounds as defined above.

The employment of the photosensitive basic compounds which can be decomposed by the irradiation of light or radiation is preferable, since the photosensitive basic compounds are capable of minimizing the deterioration of sensitivity that may be caused to occur concomitant with the addition of basic compounds. Preferable examples of such photosensitive basic compounds include sulfonium compounds and iodonium compounds.

Especially preferable examples of such sulfonium compounds and iodonium compounds are triphenylsulfonium acetate, triphenyl sulfonium hydroxide, triphenyl sulfonium phenolate, tris-(4-methylphenyl) sulfonium hydroxide, tris-(4-methylphenyl) sulfonium acetate, tris-(4-methylphenyl) sulfonium phenolate, diphenyl iodonium hydroxide, diphenyl iodonium acetate, diphenyl iodonium phenolate, bis-(4-t-butylphenyl) iodonium hydroxide, bis-(4-t-butylphenyl) iodonium acetate, bis-(4-t-butylphenyl) iodonium phenolate, thiophenyl-substituted triphenylsulfonium acetate, and thiophenyl-substituted triphenylsulfonium hydroxide.

In addition to the aforementioned basic compounds, it is also possible to incorporate other basic compounds into the ink. Further, onium salts are to be employed as a photo-acid generating agent, the photo-acid generating agent should preferably be selected from those which are similar in kinds to the basic compound. For example, if the photo-acid generating agent and the basic compound are both formed of sulfonium compounds or iodonium compounds, it would be possible to obtain excellent effects in terms of sensitivity and shelf life stability.

The first solution may further contain a radically polymerizable compound. The employment of a radically polymerizable compound is effective in minimizing the influence of strong basicity of printing surface or the influence of acids on the pigment or on the printing surface. Examples of such radically polymerizable compounds include, for example, an acrylic monomer, a methacrylic monomer, a styrene monomer, and a compound having a plurality of vinyl-based polymerizable groups of these monomers. Among them, CEL2000 (trademark, DAICEL Chemical Industries, Ltd.); glycidyl methacrylate; and a compound provided with radically polymerizable as well as cationically polymerizable properties such as ester compounds to be derived from vinyl alcohols and acrylic acid, methacrylic acid, etc. are advantageous in the respects that these compounds can be polymerized not only radically but also cationically. In this case, a photoradical polymerization initiator such as Michler's ketone known as Irgar Cure (trade mark) and benzophenone, or a photocrosslinking type radical generating agent such as bisazide can be incorporated into the ink together with the aforementioned radically polymerizable compounds. This technique may be employed also in a case where the ink layer is required to have excellent chemical resistance after the curing thereof.

Next, the second solution will be explained in detail.

The second solution can be obtained by dissolving a photo-acid generating agent in a solvent, the photo-acid generating agent being capable of generating acid as it is irradiated with light. This second solution is generally called as a reaction liquid.

As for the photo-acid generating agent, specific examples of which include onium salt, diazonium salt, quinone diazide compounds, organic halide compounds, aromatic sulfonate compounds, bisulfone compounds, sulfonyl compounds, sulfonate compounds, sulfonium compounds, sulfamide compounds, iodonium compounds, sulfonyl diazomethane compounds and mixtures of these compounds.

Specific examples of the aforementioned compounds include triphenylsulfonium triflate, diphenyliodonium triflate, 2,3,4,4-tetrahydroxybenzophenone-4-naphthoquinone diazide sulfonate, 4-N-phenylamino-2-methoxyphenyl diazonium sulfate, 4-N-phenylamino-2-methoxyphenyldiazonium-p-ethylphenyl sulfate, 4-N-phenylamino-2-methoxyphenyldiazonium-2-naphthyl sulfate, 4-N-phenylamino-2-methoxyphenyldiazonium-phenyl sulfate, 2,5-diethoxy-4-N-4'-methoxyphenylcarbonylphenyldiazonium-3-carboxy-4-hydroxyphenyl sulfate, 2-methoxy-4-N-phenylphenyldiazonium-3-carboxy-4-hydroxyphenyl sulfate, diphenylsulfonyl methane, diphenylsulfonyl diazomethane, diphenyl disulfone, α-methylbenzoin tosylate, pyrogallo trimesylate, benzoin tosylate, MPI-103 (CAS.NO.[87709-41-9]; Midori Kagaku Co., Ltd.), BDS-105 (CAS.NO.[145612-66-4]; Midori Kagaku Co., Ltd.), NDS-103 (CAS.NO.[110098-97-0]; Midori Kagaku Co., Ltd.), MDS-203 (CAS.NO.[127855-15-5]; Midori Kagaku Co., Ltd.), Pyrogallo tritosylate (CAS.NO.[20032-64-8]; Midori Kagaku, Co., Ltd.), DTS-102 (CAS.NO.[75482-18-7]; Midori Kagaku Co., Ltd.), DTS-103 (CAS.NO.[71449-78-0]; Midori Kagaku Co., Ltd.), MDS-103 (CAS.NO.[127279-74-7]; Midori Kagaku Co., Ltd.), MDS-105 (CAS.NO.[116808-67-4]; Midori Kagaku Co., Ltd.), MDS-205 (CAS.NO.[81416-37-7]; Midori Kagaku Co., Ltd.), BMS-105 (CAS.NO.[149934-68-9]; Midori Kagaku Co., Ltd.), TMS-105 (CAS.NO.[127820-38-6]; Midori Kagaku Co., Ltd.), NB-101 (CAS.NO.[20444-09-1]; Midori Kagaku Co., Ltd.), NB-201 (CAS.NO.[4450-68-4]; Midori Kagaku Co., Ltd.), DNB-101 (CAS.NO.[114719-51-6]; Midori Kagaku Co., Ltd.), DNB-102 (CAS.NO.[131509-55-2]; Midori Kagaku Co., Ltd.), DNB-103 (CAS.NO.[132898-35-2]; Midori Kagaku Co., Ltd.), DNB-104 (CAS.NO.[132898-36-3]; Midori Kagaku Co., Ltd.), DNB-105 (CAS.NO.[132898-37-4]; Midori Kagaku Co., Ltd.), DAM-101 (CAS.NO.[1886-74-4]; Midori Kagaku Co., Ltd.), DAM-102 (CAS.NO.[28343-24-0]; Midori Kagaku Co., Ltd.), DAM-103 (CAS.NO.[14159-45-6]; Midori Kagaku Co., Ltd.), DAM-104 (CAS.NO.[130290-80-1] and CAS.NO.[130290-82-3]; Midori Kagaku Co., Ltd.), DAM-201 (CAS.NO.[28322-50-1]; Midori Kagaku Co., Ltd.), CMS-105 (Midori Kagaku Co., Ltd.), DAM-301 (CAS.NO.[138529-81-4]; Midori Kagaku Co., Ltd.), SI-105 (CAS.NO.[34694-40-7]; Midori Kagaku Co., Ltd.), NDI-105 (CAS.NO.[133710-62-0]; Midori Kagaku Co., Ltd.); EPI-105 (CAS.NO.[135133-12-9]; Midori Kagaku Co., Ltd.); and UVACURE 1591 (DAICEL UCB Co., Ltd.). The following compounds can be also employed as a photo-acid generating agent in this case.

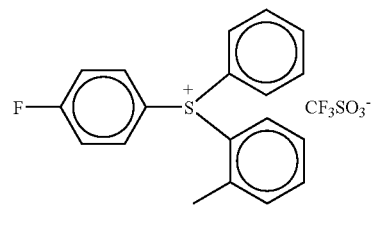

FDS-105

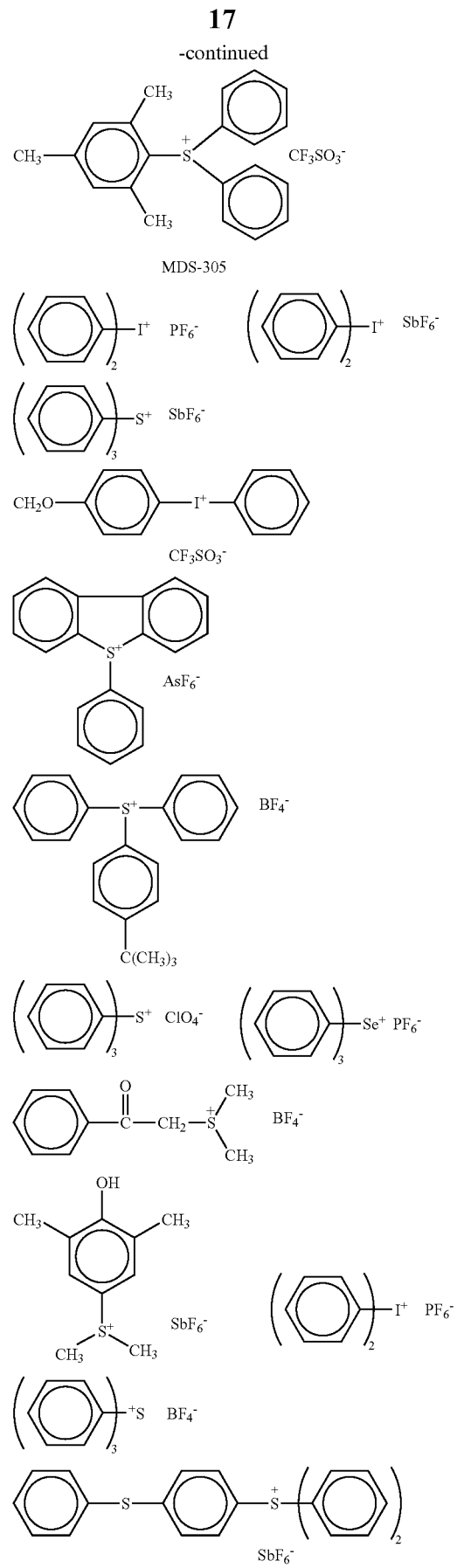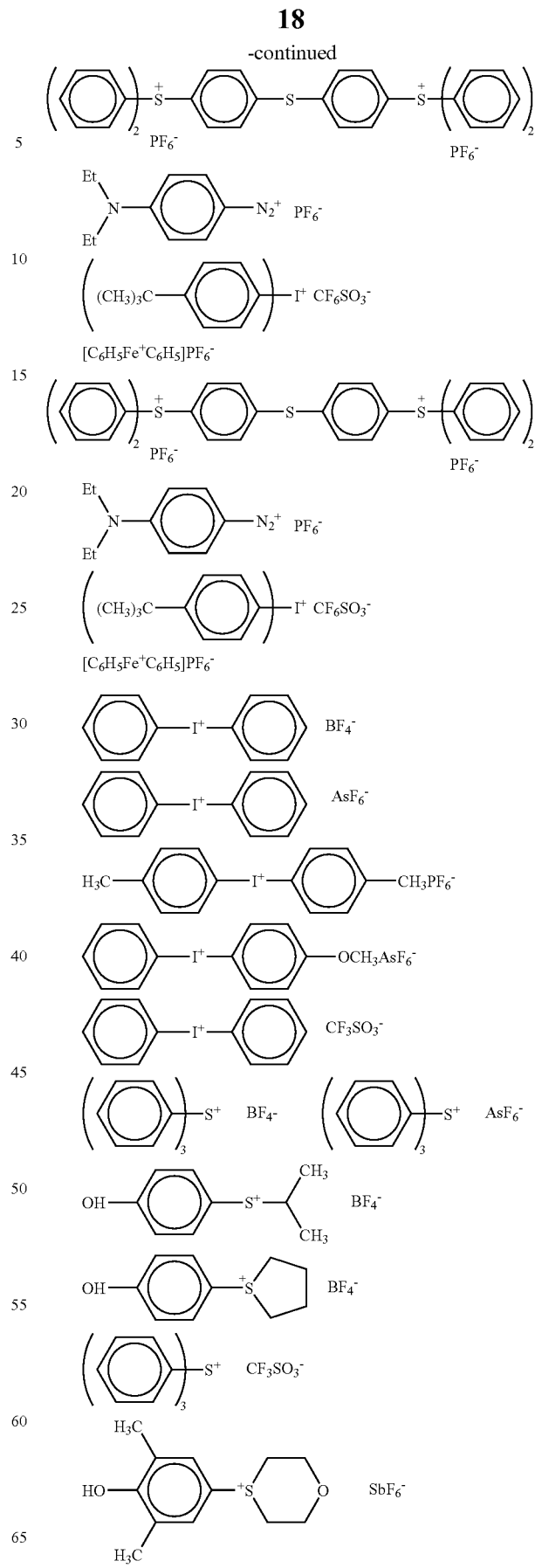

-continued

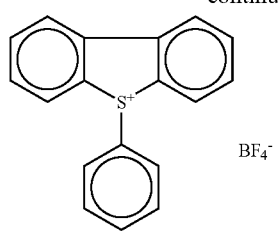
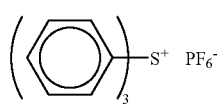
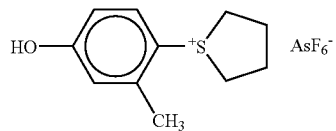
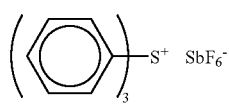
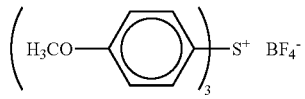
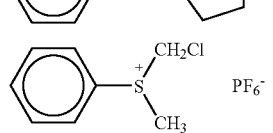
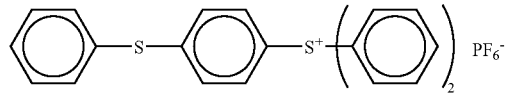
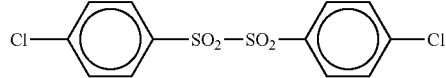
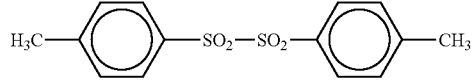
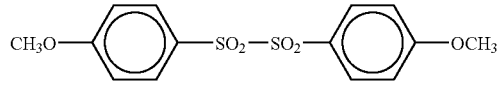
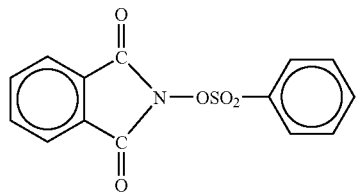
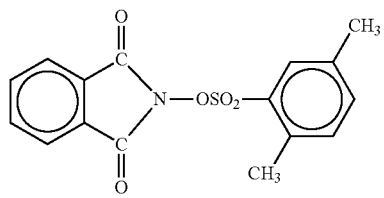

-continued

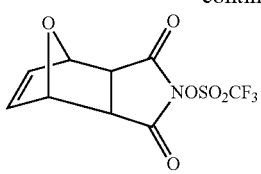
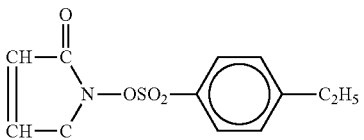
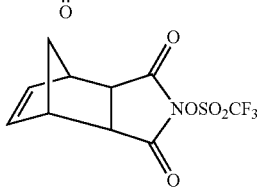
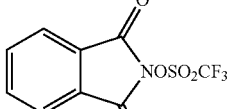
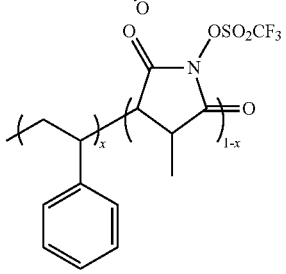
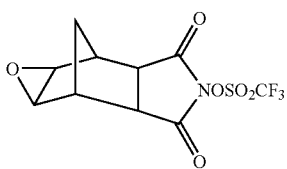
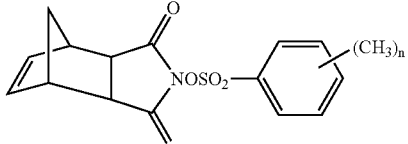
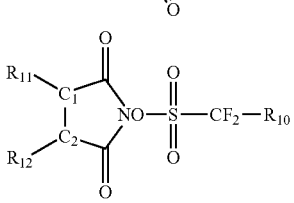
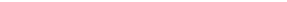

(wherein C1 and C2 respectively represents carbon atom forming a single bond or a double bond; $R_{10}$ is hydrogen atom, fluorine atom, alkyl group or aryl group; and $R_{11}$ and $R_{12}$ may be the same or different and are individually monovalent organic group with the proviso that these $R_{11}$ and $R_{12}$ may be combined to form a ring structure).

Further, the following compounds can be also employed as a photo-acid generating agent.

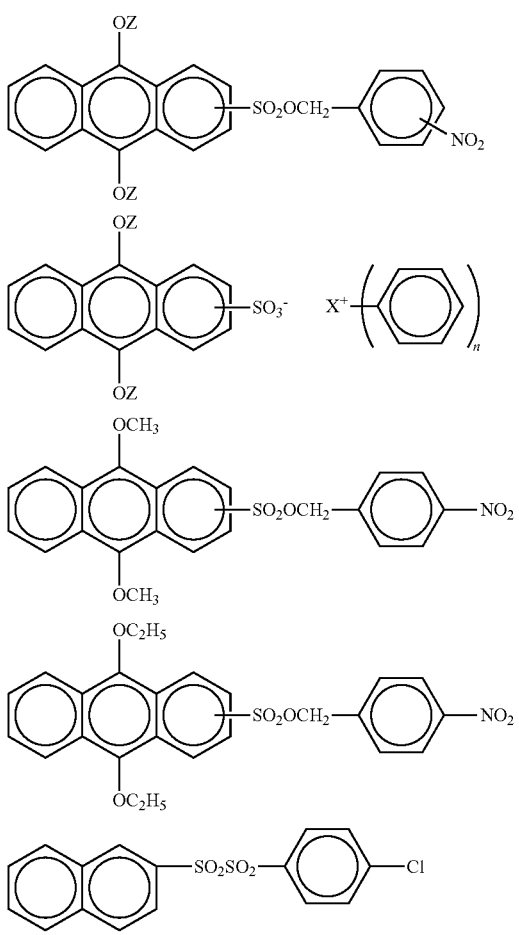

(wherein Z represents alkyl group)

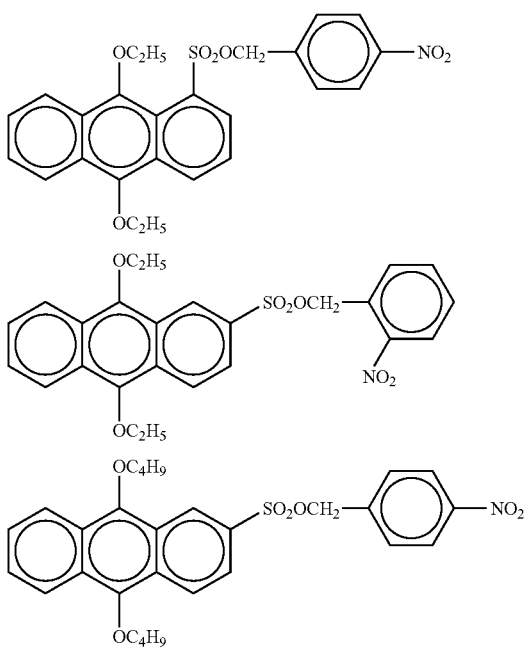

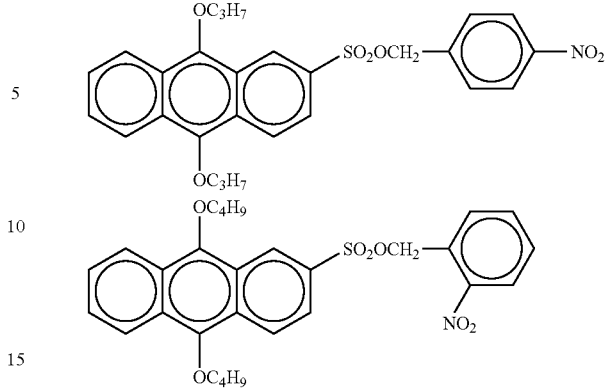

It is preferable to employ onium salts as a photo-acid generating agents, examples of onium salts useful in this case including diazonium salts, phosphonium salts and sulfonium salts having, as a counter ion, fluoroboric acid anion, hexafluoroantimonic acid anion, hexafluoroarsenic acid anion, trifluoromethane sulfonate anion, paratoluene sulfonate anion, or paranitrotoluene sulfonate anion. In particular, it is preferable that the photo-acid generating agent comprises onium salts represented by the following general formulas (4) or (5) or triazine halide compounds. These photo-acid generating agents are advantageous in both sensitivity and stability.

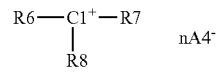

(4)

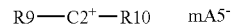

(5)

wherein R6, R7, R8, R9 and R10 individually represents either aromatic group or functional group having a chalcogenide atom and an aromatic group; C1 and C2 individually represents an aromatic group and a chalcogenide atom; A4 and A5 individually represents anion species selected from the group consisting of $PF_6^-$, $SbF_6^-$, $BF_4^-$, $AsF_6^-$, $CF_3SO_3^-$, $C_4F_9SO_3^-$ and $CH_3SO_3^-$; and m and n individually represents an integer. Incidentally, the term "chalcogenide atom" means a chalcogen atom and other atoms which are more positive than the chalcogen atoms. Further, "chalcogen atom" means to include sulfur, selenium, tellurium, polonium and iodine atoms.

The onium salts represented by the aforementioned general formulas (4) or (5) are high in curing reactivity and excellent in stability at the ordinary temperature. Therefore, the onium salts are capable of suppressing the curing of recording ink under the conditions where light is not irradiated thereto.

When the compounds represented by the afore-mentioned general formulas (4) and (5) are to be employed as a photo-acid generating agent, the aforementioned chalcogenide atom should preferably be selected from sulfur atom and iodine atom in view of securing the thermal stability of the agent and the stability thereof to water. In this case, the anion species should preferably be formed of a non-organic acid, in particular, formed of $PF_6^-$ in view of securing suitable acidity and thermal stability. Further, it is especially preferable to employ hexafluorophosphate compounds having a phenylsulfonium skeleton in view of improving the photosensitivity of the photo-acid generating agent.

The photo-acid generating agent may further contain, if required, a sensitizing dye. Examples of such a sensitizing dye include acridine compounds, benzofuravins, perylene, anthracene and laser dyes.

When quinone diazide compounds are to be employed as a photo-acid generating agent, it is possible to employ salts thereof such as naphthoquinone diazide sulfonyl chloride and naphthoquinone diazide sulfonate.

Organic halides that can be employed as a photo-acid generating agent mean compounds which are capable of forming hydroacid halides. Examples of such halides are set forth for example in U.S. Pat. No. 3,515,552; No. 3,536,489; and No. 3,779,778; and in German Patent Laid-Open Publication No. 2243621. Specifically, U.S. Pat. No. 3,515,552 describes carbon tetrabromide, tetra(bromomethyl) methane, tetrabromoethylene, 1,2,3,4-tetrabromobutane, trichloroethoxy ethanol, p-iodophenol, p-bromophenol, p-iodobiphenyl, 2,6-dibromophenol, 1-bromo-2-naphthol, p-bromoaniline, hexachloro-p-xylene, trichloroacetoanilide, p-bromodimethyl aniline, tetrachlorotetrahydronaphthalene, α,α'-dibromoxylene, α,α,α',α'-tetrabromoxylene, hexabromoethane, 1-chloroanthraquinone, ω,ω,ω-tribromoquinalizine, hexabromocyclohexane, 9-bromofluorene, bis(pentachloro) cyclopentadiphenyl, polyvinylidene chloride and 2,4,6-trichlorophenoxyethyl vinylether. U.S. Pat. No. 3,779,778 describes hexabromoethane, α,α,α-trichloroacetophenone, tribromotrichloroethane and halomethyl-S-triazine. Among them, halomethyl-S-triazine such as 2,4-bis(trichloromethyl)-6-methyl-S-triazine and 2,4,6-tris(trichloromethyl)-S-triazine are preferable for use. More preferable examples of the organic halide compound include those which are substituted by vinylhalomethyl-S-triazine, which is disclosed in U.S. Pat. No. 3,987,037. This vinylhalomethyl-S-triazine compound is a photo-decomposable S-triazine having at least one trihalomethyl group and a group which is conjugated through at least one ethylenic unsaturated bond with triazine ring, this vinylhalomethyl-S-triazine compound being represented by the following general formula (A):

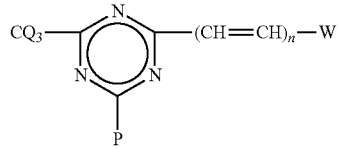

(A)

wherein Q represents bromine atom or chlorine atom; P represents —CQ₃, —NH₂, —NHR, —NR₂ or —OR; R is phenyl group or lower alkyl group having not more than 6 carbon atoms; n is an integer ranging from 1 to 3; and W represents aromatic ring, hetrocyclic ring of a group represented by the following general formula (B):

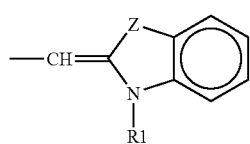

(B)

wherein Z represents oxygen atom or sulfur atom; and R1 represents lower alkyl group or phenyl group.

The aromatic ring or heterocyclic ring both represented by W in the aforementioned general formula (A) may be further substituted by other kinds of substituent groups. The substituent groups that can be employed in this case include, for example, chlorine atom, bromine atom, phenyl group, lower alkyl group having not more than 6 carbon atoms, nitro group, phenoxy group, alkoxy group, acetoxy group, acetyl group, amino group and alkylamino group. Specific examples of the vinylhalomethyl-S-triazine compound represented by the aforementioned general formula (A) include the following compounds.

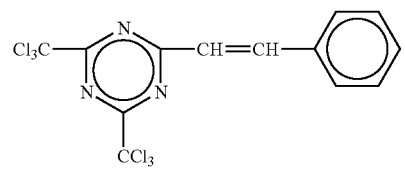

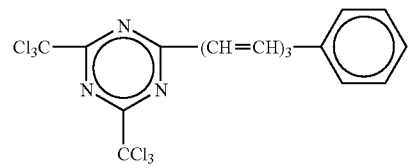

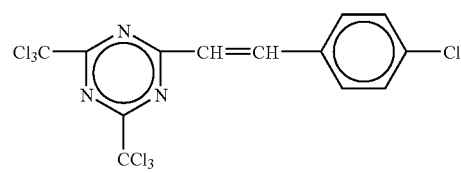

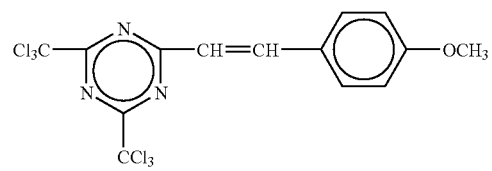

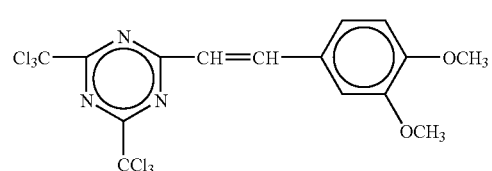

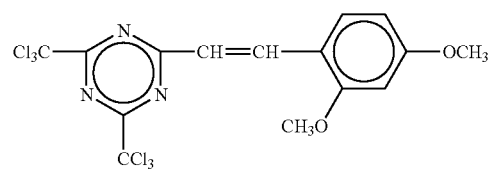

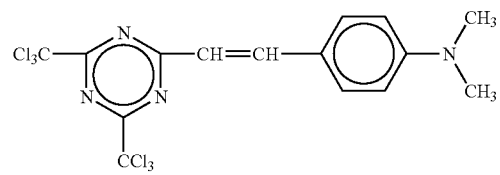

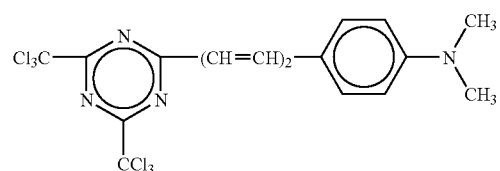

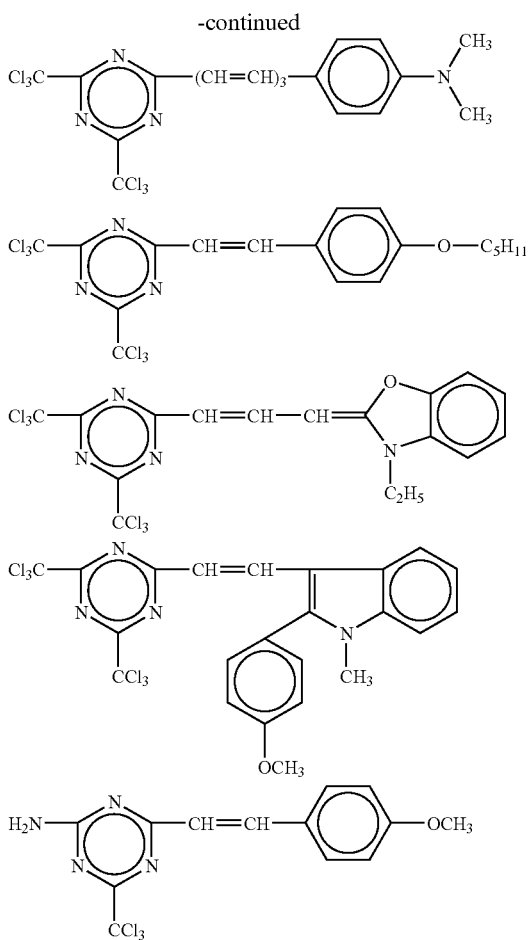

Additionally, it is also possible to suitably employ, as a photo-acid generating agent, a compound having triazine ring having trihalomethane introduced into the skeleton thereof. If this triazine ring is provided with as many as four or more conjugated double bonds, the photosensitive wavelength of the photo-acid generating agent would be shifted to the longer wavelength side. Therefore, if an ordinary high-pressure mercury lamp is to be employed as a light source, the employment of such a compound would be preferable. Specific examples of such a compound include triazine having naphthalene substituent group.

Further, it is possible to suitably employ acid esters having photodissociating property as a photo-acid generating agent. Specific examples of such esters include orthonitrobenzyl ester of alumisilanol.

The mixing ratio of the photo-acid generating agent in the recording ink may be selected depending on the acid generating efficiency of the photo-acid generating agent as well as on the quantity of the color component. For example, when the concentration of the color component in the recording ink is about 5% by weight, the mixing ratio of the photo-acid generating agent may be confined within the range of 1 to 10 parts by weight per 100 parts by weight of the total quantity of solid matters included in the recording ink. If the mixing ratio of the photo-acid generating agent is less than 1 part by weight per 100 parts by weight of the total quantity of solid matters included in the photo-acid generating agent, the sensitivity of the recording ink would be deteriorated. On the other hand, if the mixing ratio of the photo-acid generating agent exceeds over 10 parts by weight, increase in viscosity with time of the ink would be intensified thereby deteriorating the coating properties of the ink and lowering the hardness of the ink film that has been photo-cured. Therefore, the mixing ratio of the photo-acid generating agent should preferably be confined within the range of 2 to 8 parts by weight, more preferably within the range of 2 to 4 parts by weight. The mixing ratio of the photo-acid generating agent in the second solution should be suitably adjusted so as to enable the recording ink having the first solution mixed therein to contain a suitable quantity of the photo-acid generating agent as defined above.

As for the solvent for dissolving the afore-mentioned photo-acid generating agent, the same solvents that can be employed in the first solution are useful.

As in the case of the aforementioned first solution, it is generally desired that the second solution is prepared so as not to contain any volatile component such as water and organic solvents. However, organic solvents to be employed in the preparation of raw materials, such as methylethyl ketone, propylene glycol-based solvents and ethyl lactate may be contained, in an unavoidable quantity, in the second solution. Further, if the ink jet recording apparatus is provided with a gas exhausting mechanism or a solvent recovery mechanism for instance, a little quantity of organic solvents may be contained in the solution for the purpose of obtaining desired printed matters. In this case, it is preferable, in safety viewpoint, to employ water, alcohols such as ethanol, propanol or petroleum components such as isoper and terpene.

The aforementioned first and second solutions are employed in an ink jet recording apparatus according to one embodiment of the present invention and mixed with each other immediately before being introduced into the ink jet recording head. The image forming performance of the recording ink thus obtained depends largely on the chemical amplification mechanism. Namely, an acid generates from a photo-acid generating agent due to the irradiation of light thereto, and the acid thus generated is diffused due to the heating thereof, thus the acid functions as a catalyst for the crosslinking reaction or for the decomposition reaction. Therefore, in the case of this recording ink, the presence of basic ions would become a cause for deteriorating the sensitivity of the ink. Therefore, attention should be paid so that the recording ink can be prevented from being contaminated by a large quantity of basic ions not only in the process of preparing the recording ink but also in the process of manufacturing each of the constituent components.

FIG. 1 schematically shows the ink jet recording apparatus according to one embodiment of the present invention.

Referring to FIG. 1, recording ink is fed from an ink stirring container 2 at a pressure of water head to an ink jet head 20. The ink thus supplied is then discharged onto a recording medium M that has been delivered thereto by a delivery means (not shown) to form an image. The first solution as a color ink and the second ink as a reaction liquid are introduced into the ink stirring container 2 in such a manner that these solutions can be mixed together at a predetermined ratio. Namely, the mixing ratio (S2/S1) between the introduced volume (S2) of the second solution and the introduced volume (S1) of the first solution in the ink stirring container 2 is generally controlled to about 1/32. As explained above, the first solution contains a solvent which can be polymerized in the presence of an acid, and a color component and is supplied through a color ink supply pump 6 from a color ink container 5. The first solution may be fed from the color ink container 5 at a pressure of water head to the ink stirring container 2. In view of the shelf life of the ink, this first solution should preferably contain a basic compound. On the other hand, the second solution contains a photo-acid generating agent and is supplied through a reaction liquid supply pump 4 from a reaction liquid container 3. The second solution may be fed from the reaction liquid container 5 at a pressure of water head to the ink stirring container 2.

Since the quantities of these first and second solutions to be introduced into the ink stirring container 2 differ from each other, a couple of containers (color ink container 5 and reaction liquid container 3) for respectively accommodating these two solutions differ also in capacity from each other. Thus, the ratio (V2/V1) between the capacity (V2) of the reaction liquid container 3 and the capacity (V1) of the color ink container 5 should preferably be smaller than the mixing ratio (S2/S1) of these solutions in the ink stirring container 2. It is possible in this manner to reduce the frequency of exchanging the color ink container 5 as compared with the frequency of exchanging the reaction liquid container 3. As a result, the frequency of stopping the printing operation for the purpose of exchanging the color ink container 5 can be reduced, thus making it possible to enhance the productivity. As explained hereinafter, it has been found out by the present inventors that the increase in viscosity of ink is caused to occur due to the thermal decomposition of the photo-acid generating agent and that the viscosity of the color ink cannot be increased as long as the color ink is kept in single. Therefore, the first solution placed inside the color ink container 5 gives no influence to the increase of viscosity even if the preservation period thereof is prolonged and hence, there is little possibility of deteriorating the image to be obtained.

The ink stirring container 2 is provided therein with a stirring blade 8 which is connected with a motor 7, thereby enabling the reaction liquid and the color ink to be agitated and mixed with each other, thus making it possible to obtain an ink jet recording ink. In the vicinity of the ink stirring container 2, the reaction liquid container 3 and the color ink container 5, there are disposed a recording ink residue-detecting sensor 9, a reaction liquid residue-detecting sensor 10 and color ink residue-detecting sensor 11, respectively. These sensors are constructed as follows. On the side of each of the ink stirring container 2, the reaction liquid container 3 and the color ink container 5, there is disposed a transparent window, to which the beam of LED, etc. is irradiated. The reflected ray of this beam is then detected by these sensors, thus the residue of the ink is measured based on the changes of the magnitude of reflected ray. Further, the recording ink residue-detecting sensor 9 is also capable of detecting not only the presence or absence of the residue of ink inside the ink stirring container 2 but also the level of the residue of ink.

Furthermore, a cooling fan 12 is disposed in the vicinity of the reaction liquid container 3 to prevent the storage temperature of the reaction liquid from being increased higher than a predetermined temperature. It has been found out by the present inventors that any increase in viscosity of the ink for ink jet is caused by the acid that has been generated from the decomposition of the photo-acid generating agent under the condition of high temperatures. Therefore, the generation of the acid can be minimized by keeping the reaction liquid container 3 at a lower temperature, thus making it possible to further suppress any increase in viscosity of the recording ink produced from the mixing of these first and second solutions. The mixing ratio of the second solution constituted by the reaction liquid is as small as 3 parts by weight per 100 parts by weight of the recording ink 100 produced from the mixing of these first and second solutions. Therefore, even if the capacity of the reaction liquid container 3 is made smaller, the frequency of supplying it with the reaction liquid would not be increased to such an extent that may cause the productivity to decrease substantially. Further, since the reaction liquid container 3 is made smaller, the reaction liquid container 3 can be kept at low temperatures using only a small magnitude of electric power even if cooling means such as fan or Peltier element is employed.

On the downstream side, in the direction of transferring the recording medium, of the ink jet head 20, there are successively disposed a light source 13 and a heating device 14.

The light source 13 irradiates light to the ink layer formed on the recording medium M, to generate acid in the ink layer. As for the light source 13, it is possible to employ a mercury lamp such as a low, medium or high pressure mercury lamp; a tungsten lamp; an arc lamp; an excimer lamp; an excimer laser, a semiconductor laser; a YAG laser; a laser system constituted by a combination of laser and non-linear optical crystal; an electron beam irradiating apparatus; an X-ray irradiating apparatus; etc. Among them, the employment of the high pressure mercury lamp or the semiconductor laser would be more preferable, since these devices are advantageous in simplifying the system involved.

The heating device 14 heats the ink layer formed on the recording medium M, to promote the crosslinking reaction using an acid as a catalyst. As for this heating device 14, it is possible to employ an infrared lamp; a blower for ejecting hot air or heated air; a roller (heat roller) housing therein a heating element; etc.

As shown in FIG. 1, a controller 101 for controlling the operation of the ink jet recording device 1 is connected with the ink jet recording head 20. This controller 101 is further connected with a power source 103 for driving the ink jet recording head 20 and with an image data processing/storing device 102 for processing and storing an image data that has been formed by the ink jet recording head 20.

Figure 2:
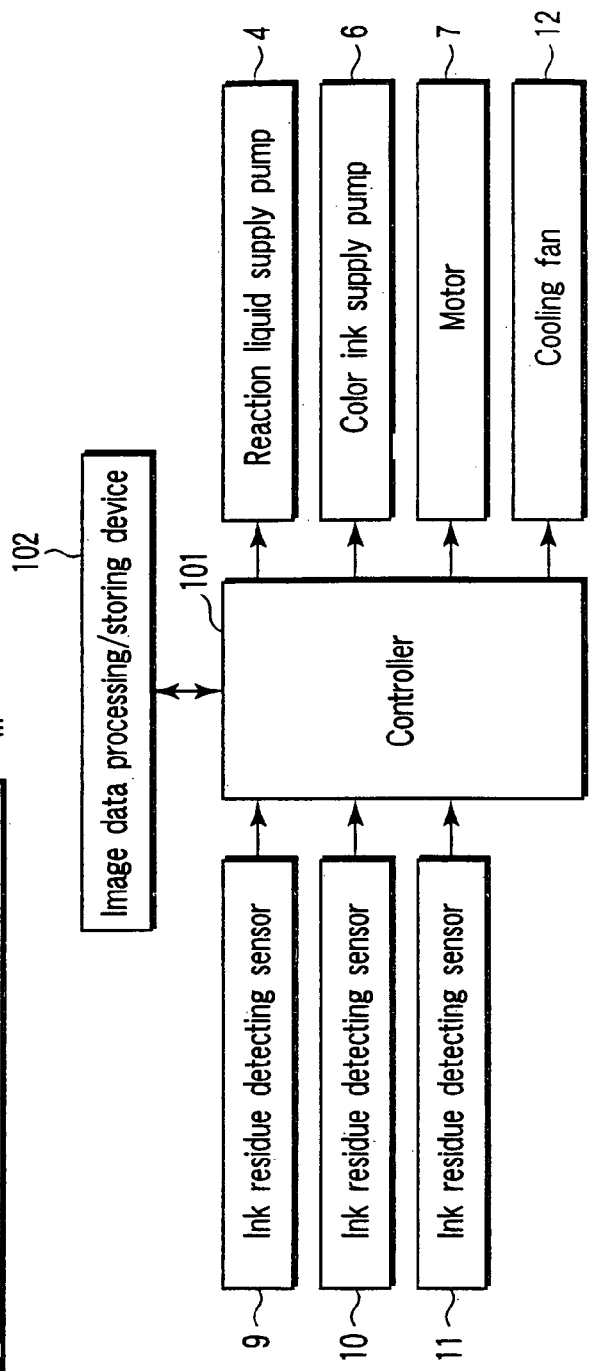
FIG. 2 is a block diagram for illustrating the control system of the ink jet recording apparatus shown in FIG. 1.

FIG. 2 is a block diagram illustrating the ink jet recording device 1. The signals from the ink residue sensors 9, 10 and 11 are fed to the controller 101. Further, the signals for controlling the operations of the reaction liquid supply pump 4, the color ink supply pump 6, the motor 7 and the cooling fan 12 are delivered thereto from this controller 101.

The first solution and the second solution are controlled as explained below and fed to the ink stirring container 2. When the non-existence of the recording ink inside the ink stirring container 2 is detected by the ink residue detecting sensor 9, a predetermined quantity of the second solution (reaction liquid) is delivered from the reaction liquid container 3 to the ink stirring container 2 by the reaction liquid supply pump 4. At the same time, a predetermined quantity of the first solution (color ink) is delivered from the color ink container 5 to the ink stirring container 2 by the color ink supply pump 6.

The quantity of supplying each of these solutions should preferably be adjusted as explained below. Namely, these two solutions should preferably be supplied in such a manner that the quantity of the photo-acid generating agent in the ink after being mixed inside the ink stirring container 2 is controlled to fall within the range of 1 to 10 parts by weight. When these two solutions are supplied in this manner, any increase in viscosity of the ink can be minimized and a sufficient degree of cure hardness can be secured.

As a matter of fact however, the viscosity of the recording ink would be increased as soon as the second solution (reaction liquid) is mixed with the first solution (color ink) in the ink stirring container 2. The degree of viscosity increase would become larger as the residence time of the recording ink inside the ink stirring container 2 is prolonged. It would be possible to suppress the increase of viscosity by minimizing the capacity of the ink stirring container 2 and by shortening the residence time of the ink after the mixture thereof in the ink stirring container 2. However, if the quantities of these solutions to be mixed together is relatively small, the operation of supplying these solutions from a couple of containers as well as the operation of stirring and mixing in the ink stirring container 2 would be required to be frequently performed, thus deteriorating the productivity of printing.

The quantity of the recording ink to be mixed inside the ink stirring container 2 should preferably be adjusted depending on the frequency of the printing operation. For example, in a situation where the frequency of the printing operation is relatively high, the quantity of the recording ink to be prepared should be increased to reduce the frequency of the solution-feeding operation as well as the frequency of the stirring/mixing operation, thereby making it possible to suppress the deterioration of productivity of printing. On the other hand, in a situation where the frequency of the printing operation is relatively low, the quantity of the recording ink to be prepared should be decreased to shorten the residence time of the ink inside the ink stirring container 2, thereby making it possible to minimize any increase of viscosity and to prevent the printed image from being deteriorated.

These operations can be performed as follows. First of all, once the instruction of printing are given, together with information regarding the data name and the number of copies, to the controller 101, the driving time each of the reaction liquid supply pump 4 and the color ink supply pump 6 is controlled based not only on the quantity to be consumed of the recording ink that can be determined from the data size of the image data stored in the instructed image data processing/storing device 102, the printing ratio (the ratio of the number of pixels to which ink is discharged) and the number of copies, but also on the quantity of residual ink that can be indicated by the recording ink residue-detecting sensor 9. For example, when the quantity of the recording ink to be consumed in the printing is large and the quantity of residual ink inside the ink stirring container 2 is relatively small, the color ink and the reaction liquid are delivered to the ink stirring container 2 by the reaction liquid supply pump 4 and the color ink supply pump 6. On the contrary, when the quantity of the recording ink to be consumed in the printing is small and the quantity of residual ink inside the ink stirring container 2 is relatively large, the reaction liquid supply pump 4 as well as the color ink supply pump 6 are not actuated at all.

By controlling the supplying quantity of each of these solutions in this manner, the operation of supplying these solutions from these containers as well as the stirring/mixing operation inside the ink stirring container 2 can be suitably performed parallel with the printing operation. Moreover, the printing operation is not required to be suspended, thus preventing the productivity of printing from being substantially deteriorated. Additionally, it is possible to minimize any increase in viscosity of the recording ink, thus making it possible to avoid the deterioration of printed image.

The embodiments of the present invention will now be described more in detail with reference to Examples of the present invention.

According to this embodiment of the present invention, two solutions are mixed to prepare the recording ink immediately before the ink is fed to the ink jet recording head. The recording ink to be prepared in this manner should preferably be formulated such that the quantity of color component to be incorporated into a solvent is confined within the range of 1 to 25% by weight per 100% by weight of the solvent. In order to investigate a suitable range of the content of the photo-acid generating agent in the color ink, the following experiments were performed.

First of all, compounds EP1 and EP2 shown below were prepared as a solvent which is polymerizable in the presence of an acid.

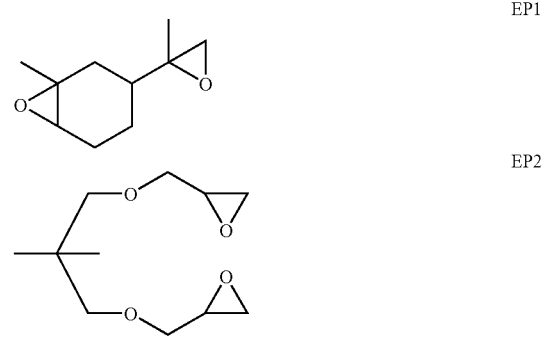

To 50% by weight of the epoxy compound EP1, 5% by weight of carbon black was added and mixed therewith to prepare the first solution.

As for the photo-acid generating agent, the following compounds PAG1 and PAG2 were employed and dissolved, at equal weight, in propylene carbonate to prepare a solution (PAG3). This photo-acid generating agent is now available as UVACURE 1591 (trade mark, DAICEL UCB Co., Ltd.)

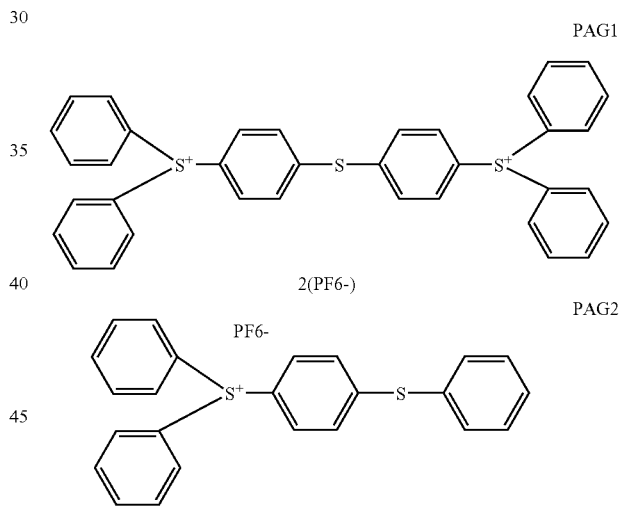

To 50% by weight of the epoxy compound EP2, PAG3 employed as a photo-acid generating agent was added at various ratios shown in the following Table 1 and mixed therewith to prepare the second solution (B1 to B7).

TABLE 1

|    | EP2 | Photo-acid generating agent (wt %) |
|----|-----|------------------------------------|
| B1 | 50  | 1                                  |
| B2 | 50  | 2                                  |
| B3 | 50  | 4                                  |
| B4 | 50  | 8                                  |
| B5 | 50  | 12                                 |
| B6 | 50  | 20                                 |
| B7 | 50  | 30                                 |

The first solution prepared in advance was mixed with this second solution to obtain samples of ink (1-7).

The curing property and shelf life of these samples of ink were investigated by the following procedures.

Assessment of Curing Property:

First of all, a sample of ink was dropped by using a disposable syringe on the surface of a transparent film such as PET film. This ink was then spread by using a bar coater so as to obtain an ink layer having a thickness of about 4 μm and subsequently irradiated with ultraviolet ray of 1500 mW/cm² at a transferring speed of 25 m/min. by using a UV irradiating machine (HP-6, Fusion Co., Ltd.). Subsequently, the ink layer was heated for one minute at a temperature of 100° C. to obtain a cured ink film.

The resultant cured ink film was evaluated with respect to the pencil hardness thereof by scratch test (pencil test) (JIS K 5600-5-4). Herein, a film having a hardness of F or more was represented by a mark "○", a hardness of HB was represented by a mark "Δ", and a hardness of B or less was represented by a mark "X", thereby evaluating the curing properties of the cured ink film.

Assessment of Shelf Life:

The shelf life of the recording ink was evaluated by accelerated test. More specifically, at first, the ink was preserved for 11 days at a temperature of 65° C. and then, the resultant ink was tested for the viscosity thereof at a temperature of 45° C. by using an E-type viscometer (Toki Sangyo Co., Ltd.). The shelf life of the ink was evaluated as follow on the basis of the increment in viscosity of the ink from the initial viscosity thereof.

Incidentally, the shelf life was evaluated on two different kinds of ink, i.e. one where the first solution and the second solution were separately preserved, the other where these two solutions were mixed together and then preserved.

○: less than 20%
Δ: 20% to less than 25%
X: 25% or more, or deposit generated

The results were summarized in the following Table 2.

TABLE 2

| Sample No. | Pencil hardness | Curing property | Preservation Preserved separately | Preserved as a mixture |
|---|---|---|---|---|
| 1 | <2B | X | ○ | ○ |
| 2 | HB | Δ | ○ | ○ |
| 3 | H | ○ | ○ | Δ |
| 4 | H | ○ | ○ | X |
| 5 | H | ○ | ○ | X |
| 6 | H | ○ | ○ | X |
| 7 | H | ○ | X | X |

With respect to the pencil hardness, samples exhibiting H or more were assessed as acceptable, and with respect to the shelf life, samples exhibiting Δ or more were assessed as practically useful level.

As shown in Table 2, in the case where the ink was preserved subsequent to the mixing of the first and second solutions, the mixing ratio of the photo-acid generating agent is required to fall within the range of 2 to 4% in order to secure practically acceptable curing property and shelf life. Whereas in the case where these first and second solutions were separately preserved, even if the photo-acid generating agent is added at a mixing ratio ranging from 2 to 20%, it is possible to secure practically acceptable curing property and shelf life.

Increase in viscosity of ink after the mixing of these two kinds of solutions can be inhibited by the addition of a basic compound acting as a viscosity stabilizing agent. For example, a compound represented by the following compound was prepared as a basic compound.

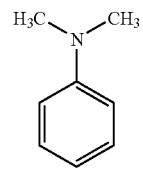

B1

The aforementioned epoxy compound, a coloring component, a photo-acid generating agent, and a basic compound were mixed together at various ratios shown in the following Table 3 to prepare samples of ink 8 to 13.

TABLE 3

| | Epoxy component | | Color component | Photo-acid generating agent | Basic compound (wt %) |
|---|---|---|---|---|---|
| Sample | EP1 | EP2 | | | |
| 8 | 50 | 50 | 5 | 8 | 0 |
| 9 | 50 | 50 | 5 | 8 | 0.2 |
| 10 | 50 | 50 | 5 | 8 | 0.4 |
| 11 | 50 | 50 | 5 | 8 | 0.6 |
| 12 | 50 | 50 | 5 | 8 | 0.8 |
| 13 | 50 | 50 | 5 | 8 | 1 |

The curing property and shelf life of these samples of ink were investigated by the same procedures as described above, the results being summarized in the following Table 4.

TABLE 4

| Sample No. | Pencil hardness | Curing property | Preservation (preserved as a mixture) |
|---|---|---|---|
| 8 | H | ○ | X |
| 9 | H | ○ | ○ |
| 10 | H | ○ | Δ |
| 11 | H | ○ | ○ |
| 12 | HB | Δ | ○ |
| 13 | B | X | ○ |

As shown in Table 4, when the basic compound was not added at all to the ink (the content of the basic compound is zero), the shelf life of the ink was very poor. However, when the basic compound was added at a ratio of 0.2 wt % or more, the shelf life of the ink was enhanced. However, when the mixing ratio of the basic compound was 1 wt % or more, the curing property of the ink was deteriorated. Therefore, the mixing ratio of the basic compound should preferably be confined within the range of 0.2 to 0.8 wt %. It has been confirmed that this mixing ratio was based on the weight of the photo-acid generating agent. Therefore, the mixing ratio of the basic compound to the photo-acid generating agent should preferably be confined within the range of 2.5 to 10 wt %.

Based on the results described above, the mixing ratio of each of the photo-acid generating agent and of the basic compound in the recording ink was determined.

EXPERIMENT 1

In order to investigate the cause for the increase of viscosity with time of a cationic cure type recording ink comprising a polymerizable compound being capable of crosslinking in the presence of an acid and constituting at least part of the solvent, a photo-acid generating agent being capable of generating an acid in response to the irradiation of light, and a color component, the following experiment was performed.

First of all, the aforementioned compounds EP1 and EP2 were mixed with each other at equal weight to prepare an epoxy resin component "a".

On the other hand, carbon black constituting a color component was kneaded together with acrylic resin functioning as a dispersing agent to prepare a mixture, to which a nonionic surfactant (Sumitomo 3M Co., Ltd.) was added to obtain a coloring mixture.

Then, the aforementioned epoxy resin component "a", the coloring mixture, and PAG3 acting as a photo-acid generating agent were mixed together at the ratios (weight %) shown in the following Table 5 to obtain samples "b", "c" and "e". Incidentally, the samples "b" and "e" were prepared by, at first, mixing the components thereof and then, subjecting the mixture to a dispersing treatment a whole day and night by using a paint shaker.

TABLE 5

| Sample | Epoxy component (a) | Color component | Photo-acid generating agent |
|---|---|---|---|
| b | 95 | 5 | 0 |
| c | 97 | 0 | 3 |
| e | 92 | 5 | 3 |

In Table 5, the mixing ratio (weight %) of the coloring mixture denotes the ratio of carbon black to the entire weight of the samples.

These four samples thus obtained were preserved in a dark room at a temperature of 65° C. to investigate any increase of viscosity with time.

The velocity of viscosity increase can be attributed to the phenomenon that a polymerization reaction initiates due to the influence of an acid generated from the decomposition of the photo-acid generating agent. Therefore, the velocity of viscosity increase has much to do with the velocity of polymerization (reaction). For the purpose of quickly knowing the viscosity at the time when the sample has been preserved for 6 months at a temperature of 25° C., an accelerating test using higher temperature preservation was employed. The measurement of viscosity was performed at a temperature of 45° C. by using an E-type viscometer (Toki Sangyo Co., Ltd.), the results thus obtained being shown in the graph of FIG. 3.

Figure 3:
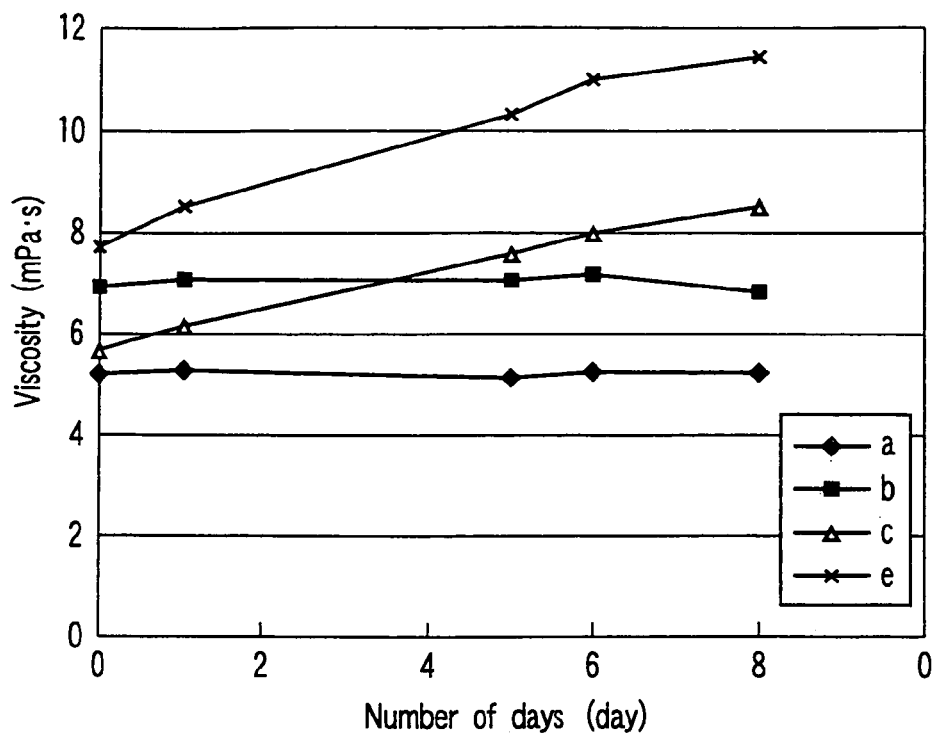
FIG. 3 is a graph for illustrating the increase in viscosity with time of a recording ink.

As shown in FIG. 3, the samples "c" and "e" indicated an increase in viscosity. The reason for this can be assembly attributed to the fact that since these samples both contained a photo-acid generating agent, a reaction generated between the photo-acid generating agent and the polymerizable compound, thereby the viscosity thereof increased. Whereas, the samples "a" and "b" indicated no increase in viscosity. In view of these facts, it was confirmed that in the cases of the samples formed of a single body of polymerizable compound or formed of a polymerizable compound having a pigment dispersed therein, there is no reaction which may become a cause for increasing the viscosity thereof.

It will be recognized from these results that as long as the photo-acid generating agent and the polymerizable compound which can be polymerized in the presence of an acid are separately preserved and both components are mixed together to form a recording ink immediately before the formation of an image, thus enabling the ink to be discharged from an ink jet recording head, it is possible to constantly deliver an recording ink having a stabilized viscosity to the ink jet recording head, thereby making it possible to obtain stabilized printing characteristics.

With a view to confirm this, the following experiment was performed.

EXPERIMENT 2

The aforementioned epoxy resin component "a", the coloring mixture, and a photo-acid generating agent were mixed together to obtain samples shown in the following Table 6. In Table 6, the mixing ratio (weight %) of the coloring mixture denotes the ratio of carbon black to the entire weight of the samples.

TABLE 6

| Sample | Epoxy component (a) | Color component | Photo-acid generating agent |
|---|---|---|---|
| f | 95 | 5 | 0 |
| g | 0 | 0 | 100 |
| e | 92 | 5 | 3 |

In the sample "g", PAG3 (UVACURE 1591, DAICEL UCB Co., Ltd.) acting as a photo-acid generating agent was employed singly.

These samples were preserved in a dark room at a temperature of 65° C. 10 days later, the sample "g" was mixed with the sample "f" at a ratio (weight %) shown in the following Table 7 to obtain a sample "h". This sample "h" was further kept in a dark room at a temperature of 65° C. This sample "h" was formed of the same composition as that of the sample "e", thus forming a cationic cure type recording ink. Namely, this sample "h" was a cationic cure type recording ink which was prepared by mixing a photo-acid generating agent with a polymerizable compound which contains a color component and is capable of polymerizing in the presence of an acid, these photo-acid generating agent and polymerizable compound being preserved separately before being mixed together.

TABLE 7

| Sample | Acid-polymerizable component (f) | Photo-acid generating agent (g) |
|---|---|---|
| h | 97 | 3 |

The viscosity of these samples was measured in such a manner that the viscosity of the sample "f" was measured up to 10th day; the viscosity of the sample "h" was measured for a period starting from 10th day up to 31st day; and the viscosity of the sample "e" was measured up to 31st day. The results obtained are shown in the graph of FIG. 4.

As in the case of the aforementioned Experiment 1, the sample "f" comprising an epoxy resin component and a color component and not containing the photo-acid generating agent was found to indicate no increase in viscosity with time even after 10 days.

Figure 4:
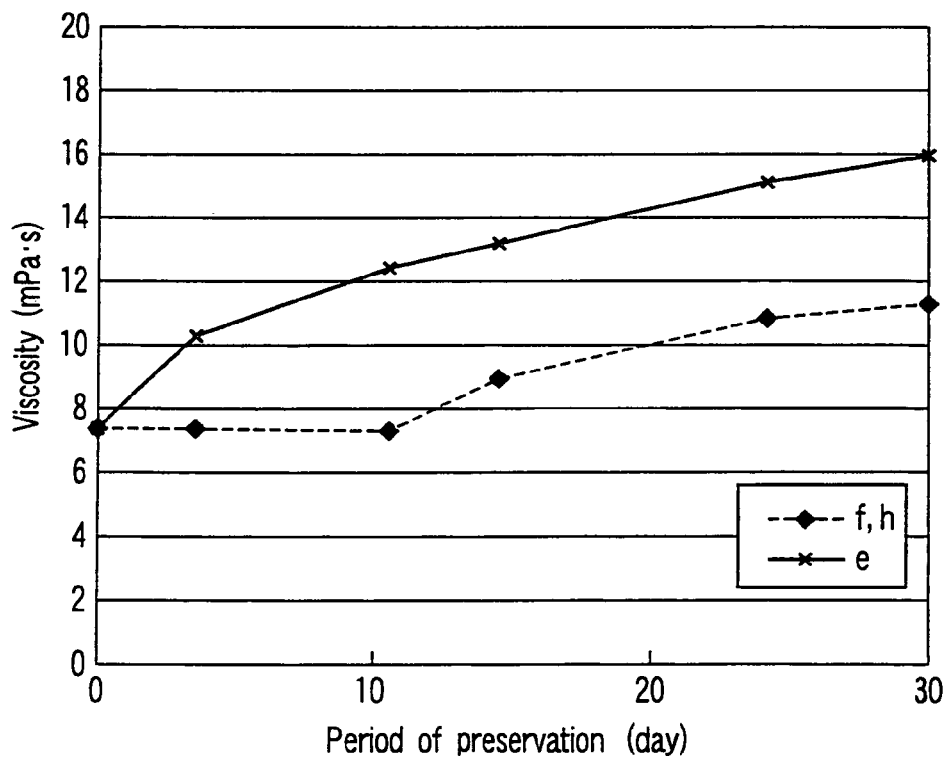
FIG. 4 is a graph for illustrating the increase in viscosity with time of a recording ink.

As shown in the graph of FIG. 4, the sample "h" indicated no fluctuation in viscosity for a period of initial 10 days.

Therefore, the degree of viscosity increase of the sample "h" as a whole was reduced to about ½ of that of the sample "e".

EXPERIMENT 3

Next, a basic compound acting as a viscosity stabilizer and/or a basicity-adjusting compound were incorporated into a color ink and then, mixed with a photo-acid generating agent to obtain a recording ink. Then, the change in viscosity with time of the ink was measured.

Then, the aforementioned epoxy resin component "a", the coloring mixture, a photo-acid generating agent and a basic compound (B1) were mixed together at the contents (weight %) shown in the following Table 8 to obtain samples "i", "g" and "e".

TABLE 8

| Sample | Epoxy component (a) | Color component | Photo-acid generating agent | Basic compound |
|---|---|---|---|---|
| i | 94.9715 | 4.9985 | 0 | 0.03 |
| g | 0 | 0 | 100 | 0 |
| e | 92 | 5 | 3 | 0 |

These samples were preserved in a dark room at a temperature of 65° C. 10 days later, the sample "g" was mixed with the sample "i" at a content (weight %) shown in the following Table 9 to obtain a sample "j". This sample "j" was further kept in a dark room at a temperature of 65° C.

TABLE 9

| Sample | Acid-polymerizable component (i) | Photo-acid generating agent (h) |
|---|---|---|
| j | 97 | 3 |

Figure 5:
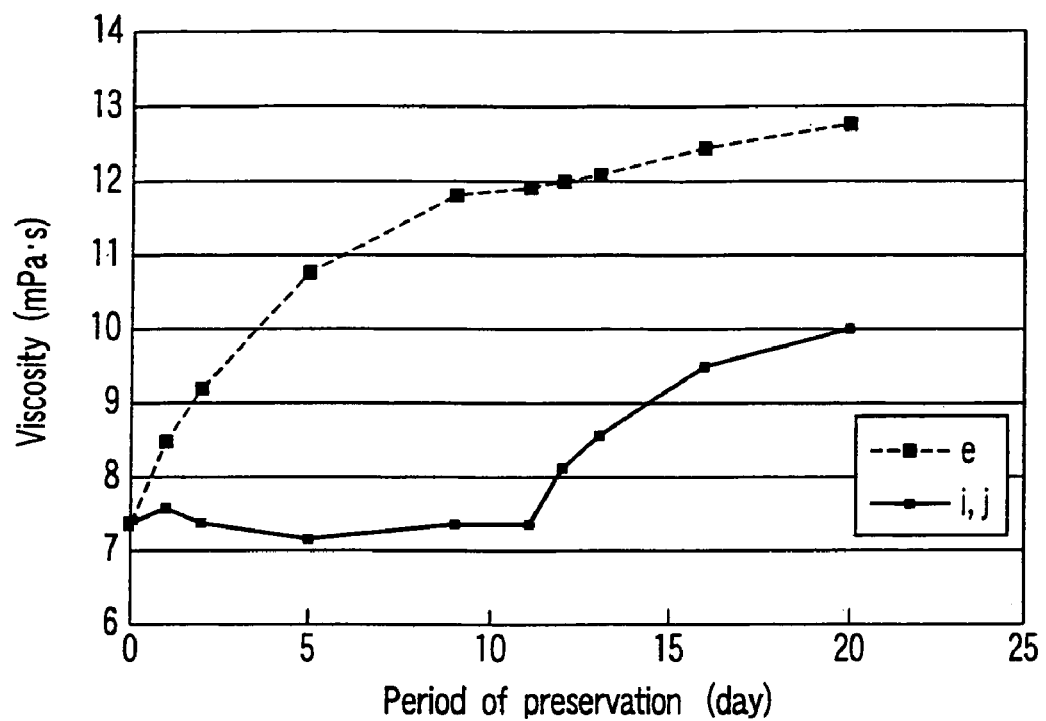
FIG. 5 is a graph for illustrating the increase in viscosity with time of a recording ink.

The viscosity of these samples was measured in such a manner that the viscosity of the sample "i" was measured up to 10th day; the viscosity of the sample "j" was measured for a period starting from 10th day up to 21st day; and the viscosity of the sample "e" was measured up to 21st day. The results obtained are shown in the graph of FIG. 5.

As in the case of FIG. 3 showing the results of the aforementioned Experiment 1, the sample "i" comprising an epoxy resin composition, carbon black dye and a basic compound and not containing the photo-acid generating agent was found to indicate no increase in viscosity with time even after 10 days.

This sample "j" was formed of the same composition as that of the sample "e", thus forming a cationic cure type recording ink. Namely, this sample "j" was a cationic cure type recording ink which was prepared by mixing a photo-acid generating agent with a polymerizable compound which contains a color component and is capable of polymerizing in the presence of an acid, these photo-acid generating agent and polymerizable compound being preserved separately before being mixed together. The sample "h" indicated no fluctuation in viscosity for a period of initial 10 days. Therefore, the degree of viscosity increase of the sample "h" as a whole was reduced to about ½ of that of the sample "e". Moreover, the speed of viscosity increase thereof from 11th day was reduced as compared with the speed of viscosity increase from the first day of the sample "e".

The reason for this may be attributed to the fact that the acid generated from the decomposition of the photo-acid generating agent is neutralized by the basic compound, thus making it possible to suppress the curing of the polymerizable compound acting as a solvent. However, if the photo-acid generating agent is mixed in advance with the basic compound, neutralization may proceed, thereby minimizing the quantity of acid to be generated even if UV ray is irradiated thereto, thus making it impossible to sufficiently cure the ink in some case.

Therefore, it is preferable that the photo-acid generating agent and the basic compound are separately preserved until they are mixed together immediately before being discharged from an ink jet head. Namely, the basic compound is mixed with a color ink containing a color component and then, preserved in a color ink container. By doing so, it is possible to allow an acid to effectively generate through the irradiation of UV rays, etc., while preventing the neutralization. As a result, it would become possible to secure a sufficient degree of cure hardness. Owing to this embodiment of the present invention, it is now possible to reduce the viscosity increase to ½ or less as compared with the prior art. As a result, it is possible to obtain an excellent image which is minimal in deterioration in concentration of printed image even if the ink is preserved for a long period of time in an ink jet recording apparatus.

EXPERIMENT 4

By using the ink that had been preserved in a dark room for a predetermined number of days at a temperature of 65° C., the curing properties of the ink were investigated in the same manner as explained above. The results thus obtained are shown in the following Table 10.

TABLE 10

|  | h (31st day) | j (21st day) | e (Com. Example) (31st day) |
|---|---|---|---|
| Pencil hardness | F or H | F | F |

According to the samples "h" and "I", it was possible, as explained above, to reduce the degree of viscosity increase with time to about ½ of that of the sample "e". At the same time, it was confirmed that the curing performance of the ink was not deteriorated at all.

Since viscosity increase can be minimized in this manner, the samples "h" and "I" can be fed to the ink jet recording head without raising any inconvenience. Incidentally, even if the color ink and the reaction liquid were preserved respectively in their containers of the ink jet recording apparatus 1 shown in FIG. 1, it was possible to minimize the viscosity increase and hence to feed them to the ink jet recording head. Namely, since the viscosity thereof was prevented from being increased, these liquids were discharged from the ink jet recording head at a stabilized quantity.

Figure 6:
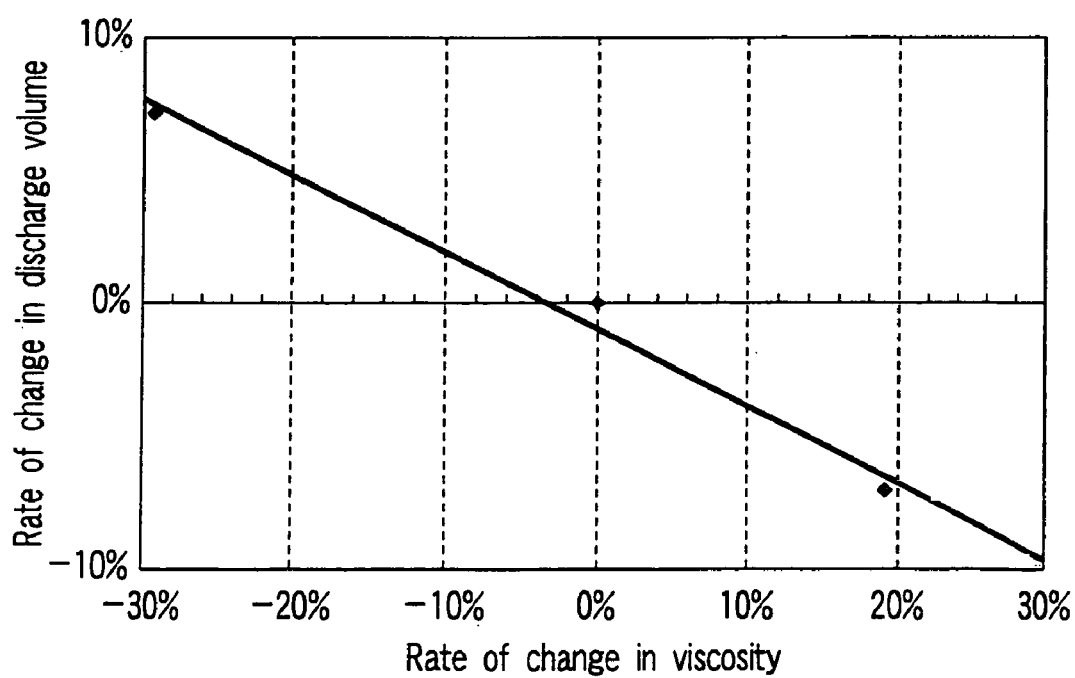
FIG. 6 is a graph for illustrating the relationship between the rate of change in viscosity of ink and the rate of change in discharge volume of ink.

The graph of FIG. 6 illustrates the relationship between the rate of change in viscosity of the recording ink and the rate of change in discharge volume of the ink. The rate of change in viscosity of the ink is inversely proportional to the rate of change in discharge volume thereof. Namely, when the viscosity of the ink increases 20%, the discharge volume thereof decreases 7 to 8%. In other words, when the viscosity of the ink is caused to increase due to the preservation thereof up to 20%, the volume of the ink to be discharged from the ink jet recording head is caused to decrease 7 to 8%. As a result, the concentration of printed image is caused to deteriorate as compared with that to be obtained before the viscosity of the ink is increased. As described above, according to the embodiment of the present invention however, the increase of viscosity of the recording ink can be reduced to ½ of that of the conventional recording ink. As a result, even if the recording ink is preserved inside the ink jet recording apparatus for a long period of time, it is possible to obtain an excellent printed image without substantially lowering the concentration of printed image.

Figure 7:
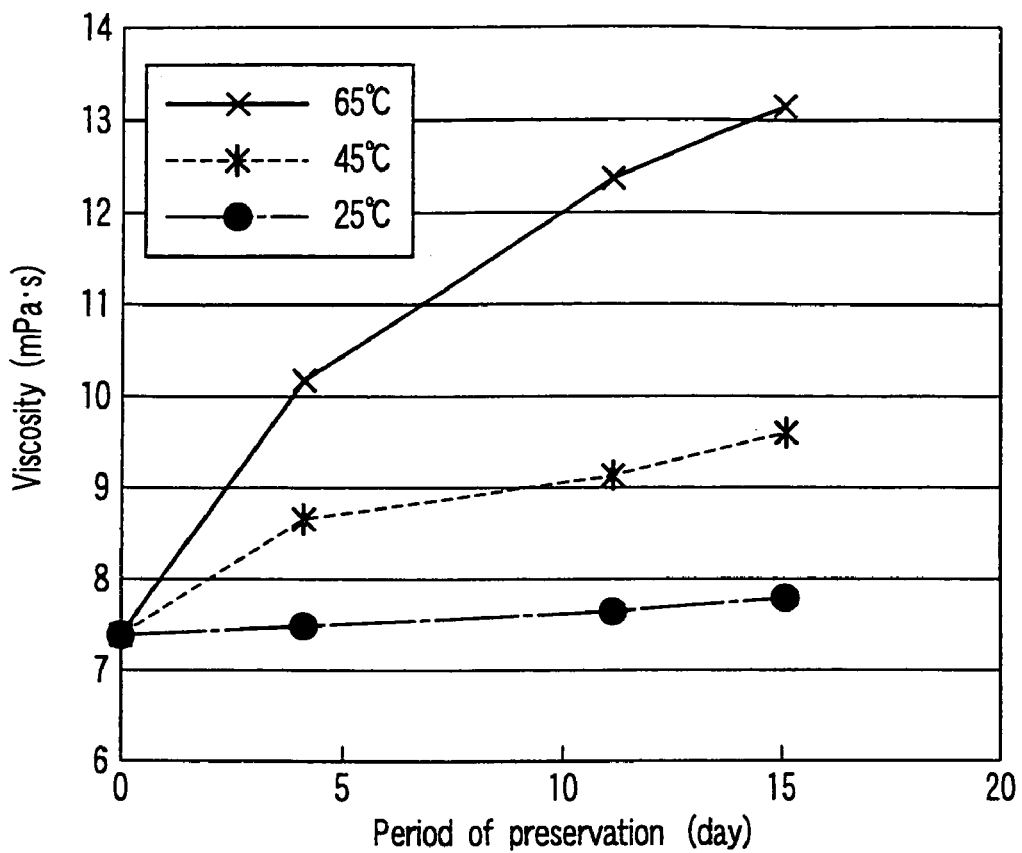
FIG. 7 is a graph for illustrating the influence of temperature on the change in viscosity of an ink composition.

The influence of preservation temperature on the increase in viscosity of the recording ink is FIG. 7. In this experiment, the aforementioned sample "e" was preserved at three different temperatures, i.e. 25° C., 45° C. and 65° C. to measure the changes of viscosity with time of the ink. As a result, it was confirmed that as the preservation temperature become higher, the rate of increase of the viscosity was correspondingly enlarged and that the increase of viscosity of the ink could be suppressed by preserving the ink at a lower temperature.

Figure 8:
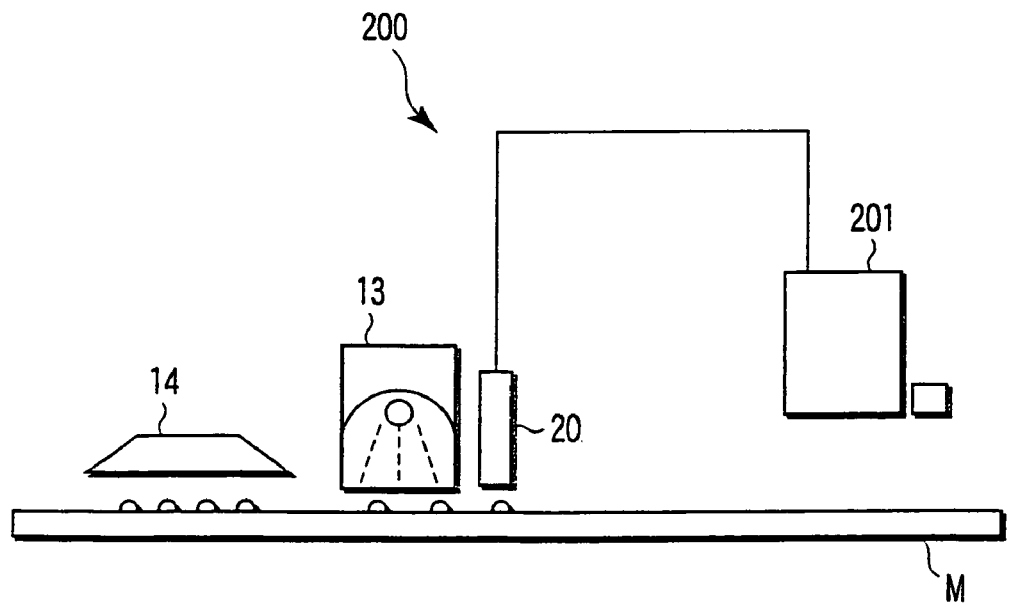
FIG. 8 is a diagram schematically illustrating an ink jet recording apparatus of the prior art.

FIG. 8 shows an ink jet recording apparatus 200 of the prior art. In this conventional ink jet recording apparatus 200, the ink is supplied from an ink container 201 to an ink jet head 20. Although the printing operation, the irradiation of light and the heating of ink layer can be performed in the same manner as those of the recording apparatus shown in FIG. 1, it is designed such that an ink composition containing all of the photo-acid generating agent, the solvent that can be polymerized in the presence of acids, and the color component is accommodated inside an ink container 201. If this ink composition is preserved under this condition for a long period of time, this ink composition would be brought to the same conditions as those of the aforementioned sample "e", thus the viscosity thereof increases considerably. Accordingly, if the ink increased in viscosity in this manner is delivered to the ink jet head 20, discharge failure would be caused to generate.

Moreover, the ink container 201 employed in this conventional ink jet recording apparatus 200 is relatively large in capacity, thus necessitating a large magnitude of electric power in order to keep it at a lower temperature. Additionally, the size of the apparatus would become unavoidably enlarged. It may be possible to keep the ink container 201 at a lower temperature with a small magnitude of electric power by decreasing the capacity of the ink container 201. However, it will lead to a frequent replenishment of the recording ink, thus raising the problem that the productivity of printing would be greatly deteriorated.

In the recording apparatus according to the embodiment of the present invention, the reaction liquid containing a photo-acid generating agent is accommodated in a container of small capacity. Therefore, the reaction liquid container can be easily cooled so as to suppress any increase in viscosity of the ink without inviting the aforementioned inconvenience.

As explained above, according to one embodiment of the present invention, it is possible to provide an ink for ink jet which is excellent in shelf life and capable of reliably obtaining a high-quality printed matter with excellent reproducibility. According to another embodiment of the present invention, it is possible to provide an ink jet recording apparatus which is capable of reliably producing a high-quality printed matter with excellent reproducibility.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ink jet recording apparatus comprising:
   a color ink container accommodating therein a color ink comprising a solvent which is polymerizable in the presence of an acid and a colorant dispersed in said solvent;
   a reaction liquid container accommodating therein a reaction liquid comprising a solvent, and a photo-acid generating agent which is dissolved in said solvent and capable of generating an acid as it is irradiated with light;
   a stirring container mixing said color ink and said reaction liquid to prepare a recording ink;
   a color ink feeder feeding said color ink at a capacity S1 from said color ink container to said stirring container;
   a reaction liquid feeder feeding said reaction liquid at a capacity S2 from said reaction liquid container to said stirring container, the capacity S2 being smaller than the capacity S1;
   an ink jet recording head ejecting said recording ink to a recording medium; and
   a supply tube feeding said recording ink to said ink jet recording head.

2. The ink jet recording apparatus according to claim 1, wherein said reaction liquid container is kept at a temperature lower than that for keeping said color ink container.

3. The ink jet recording apparatus according to claim 1, further comprising a cooling fan for cooling said reaction liquid container.

4. The ink jet recording apparatus according to claim 1, wherein a ratio between a capacity (V2) of said reaction liquid container and a capacity (V1) of said color ink container (V2<V1) is smaller than a mixing ratio (S2/S1) between said reaction liquid and said color ink in said stirring container.

5. The ink jet recording apparatus according to claim 1, further comprising an image data storing/processing device, a recording ink residue-detecting monitor detecting the quantity of residual recording ink remaining inside said agitating container, and a control device, wherein image information and residual ink information are fed respectively from said image data storing/processing device and said ink residue-detecting monitor to said control device, said image information and said residual ink information being subsequently fed to said color ink feeder as well as to said reaction liquid feeder.

6. The ink jet recording apparatus according to claim 1, wherein said color ink and said reaction liquid are fed to said stirring container at a ratio enables said recording ink to contain said photo-acid generating agent at a ratio of 1 to 20% by weight.

7. The ink jet recording apparatus according to claim 1, wherein said color ink further comprises a basic compound and/or a basicity-adjusting compound.

8. The ink jet recording apparatus according to claim 7, wherein said color ink contains a basic compound and/or a basicity-adjusting compound at a ratio of 0.1 to 0.8% by weight.

9. An ink jet recording apparatus comprising:
   a color ink container accommodating therein a color ink comprising a solvent which is polymerizable in the presence of an acid and a colorant dispersed in said solvent;
   a reaction liquid container accommodating therein a reaction liquid comprising a solvent, and a photo-acid generating agent which is dissolved in said solvent and capable of generating an acid as it is irradiated with light;

a stirring container mixing said color ink and said reaction liquid to prepare a recording ink;

a color ink supply means feeding said color ink at a capacity S1 from said color ink container to said stirring container;

a reaction liquid supply means feeding said reaction liquid at a capacity S2 from said reaction liquid container to said stirring container, the capacity S2 being smaller than the capacity S1;

an ink jet recording head ejecting said recording ink to a recording medium; and a supply tube feeding said recording ink to said ink jet recording head.

10. The ink jet recording apparatus according to claim 9, wherein said reaction liquid container is kept at a temperature lower than that for keeping said color ink container.

11. The ink jet recording apparatus according to claim 9, further comprising a cooling fan for cooling said reaction liquid container.

12. The ink jet recording apparatus according to claim 9, wherein a ratio between a capacity (V2) of said reaction liquid container and a capacity (V1) of said color ink container (V2<V1) is smaller than a mixing ratio (S2/S1) between said reaction liquid and said color ink in said stirring container.

13. The ink jet recording apparatus according to claim 9, further comprising an image data storing/processing device, a recording ink residue-detecting monitor detecting the quantity of residual recording ink remaining inside said agitating container, and a control device, wherein image information and residual ink information are fed respectively from said image data storing/processing device and said ink residue-detecting monitor to said control device, said image information and said residual ink information being subsequently fed to said color ink supply means as well as to said reaction liquid supply means.

* * * * *